US012488627B1

(12) United States Patent
Aggarwal et al.

(10) Patent No.: US 12,488,627 B1
(45) Date of Patent: Dec. 2, 2025

(54) SYSTEM FOR MULTI-MODALITY MISMATCH DETERMINATION

(71) Applicant: AMAZON TECHNOLOGIES, INC., Seattle, WA (US)

(72) Inventors: Manoj Aggarwal, Seattle, WA (US); Rajeev Ranjan, Seattle, WA (US); Gerard Guy Medioni, Los Angeles, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 412 days.

(21) Appl. No.: 18/051,203

(22) Filed: Oct. 31, 2022

(51) Int. Cl.
*G06V 40/70* (2022.01)
*G06V 10/74* (2022.01)
*G06V 10/82* (2022.01)
*G06V 10/98* (2022.01)
*G06V 40/10* (2022.01)
*G06V 40/12* (2022.01)
*G06V 40/14* (2022.01)

(52) U.S. Cl.
CPC ............ *G06V 40/70* (2022.01); *G06V 10/761* (2022.01); *G06V 10/82* (2022.01); *G06V 10/993* (2022.01); *G06V 40/11* (2022.01); *G06V 40/12* (2022.01); *G06V 40/14* (2022.01)

(58) Field of Classification Search
CPC .. G06V 40/1318; G06V 10/95; G06F 18/213; G06F 18/2148
See application file for complete search history.

(56) References Cited

U.S. PATENT DOCUMENTS

| | | | |
|---|---|---|---|
| 2019/0325342 A1* | 10/2019 | Sikka | G06F 18/22 |
| 2019/0392189 A1* | 12/2019 | Kumar | G06V 40/1312 |
| 2021/0073648 A1* | 3/2021 | Lichenstein | G06N 5/04 |
| 2021/0141896 A1* | 5/2021 | Streit | G06F 21/554 |
| 2022/0300593 A1* | 9/2022 | Brownlee | G06V 40/1353 |

OTHER PUBLICATIONS

Zhu, et al., "Unpaired Image-to-Image Translation using Cycle-Consistent Adversarial Networks", Berkeley AI Research (BAIR) laboratory, UC Berkeley, Aug. 24, 2020, pp. 1-18, https://arxiv.org/pdf/1703.10593.pdf.

* cited by examiner

Primary Examiner — Wassim Mahrouka
(74) Attorney, Agent, or Firm — Lindauer Law, PLLC

(57) ABSTRACT

A biometric identification system uses inputs of a user that are acquired using different modalities. A model having an intersection branch is trained to determine an embedding using features present in two or more modalities (an intersection of modalities). A first input acquired using a first modality is processed by the model to determine a first embedding. A second input acquired using a second modality is also processed by the model to determine a second embedding. Comparison of the first embedding and the second embedding may be used to determine if the first input and the second input are associated with the same user.

20 Claims, 11 Drawing Sheets

SYSTEM FOR MULTI-MODALITY MISMATCH DETERMINATION

BACKGROUND

Biometric input data may be used to recognize and assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
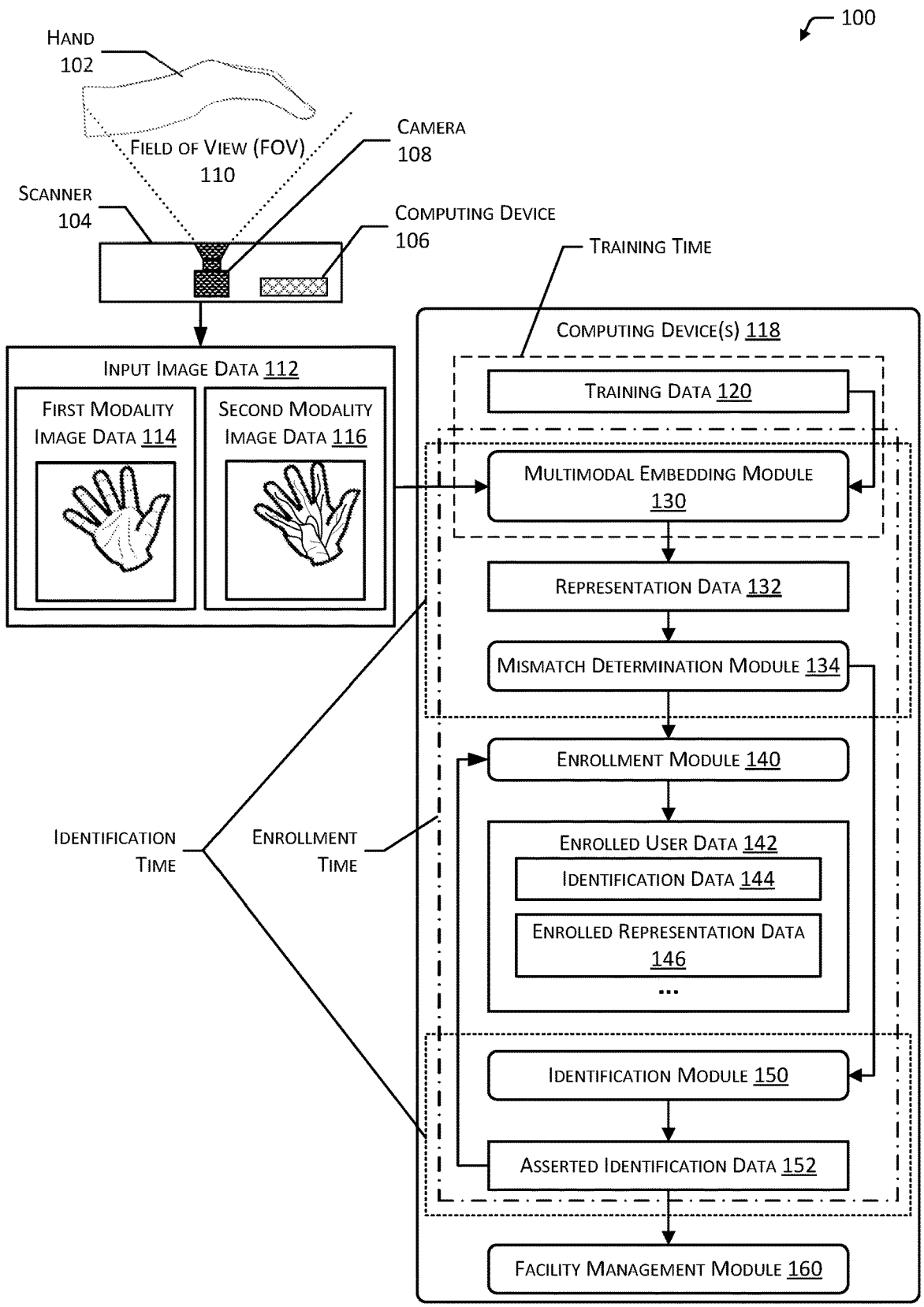
FIG. 1 illustrates a system to train and use a mismatch determination module of a biometric recognition system to determine whether input data is mismatched, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using two or more modalities. For example, a first modality may comprise images of surface skin of a user's palm while a second modality may comprise images of subcutaneous features such as veins of the user's palm. The use of input data that includes two or more modalities provides several advantages for biometric identification. One advantage is the potential for decorrelation between the modalities that may improve overall accuracy. For example, each modality may "see" different features, providing more distinct information that may better distinguish one person from another, determine the presence of an artifact such as a realistic-appearing face mask or fake hand, and so forth. While some features may be common across the different modalities, other features vary. For example, the overall shape of the hand may be apparent across modalities, while information such as friction ridges, veins, and so forth may differ between images in the different modalities acquired of the same hand.

During operation a biometric identification system acquires input data using these different modalities. During an enrollment process, enrollment images of the same hand of the user to be enrolled are acquired using the first and second modalities and processed. Enrollment data may be stored that associates information about the enrollment images with identification data such as the user's name. During a later identification process, query images of a same hand of an unidentified user are acquired using the first and second modalities and processed, with the resulting data compared to the enrolled user data to assert an identity of a previously enrolled user.

Overall operation of the system is improved if the images obtained using the different modalities correspond to the same physical hand. For example, during enrollment or identification, the first modality images and the second modality images should be of the same hand of the same person. In some circumstances, images of different hands in different modalities may be inadvertently acquired. For example, users moving rapidly past a biometric input device at an entry gate may present their hands as they walk by. The biometric input device may acquire a first modality image of a first user and a second modality image of a second user, resulting in a mismatch between the images.

Described in this disclosure are techniques to determine a mismatch between input data acquired using different modalities. If no mismatch is deemed to have occurred, the input data may be further processed such as for enrollment, query, and so forth. If a mismatch is found, an error message may be generated, the user may be prompted to provide additional input data, and so forth.

A first technique utilizes an intersection embedding module that is trained to provide intersection representation data indicative of features that are present in more than one modality. A first input image acquired using a first modality is processed using the trained intersection embedding module to determine first intersection representation data. A second input image acquired using a second modality is also processed using the trained intersection embedding module to determine second intersection representation data. The first and second intersection representation data may be compared to determine if a mismatch is present. For example, if the vectors corresponding to the first and second embeddings are less than a threshold distance of one another, the input images may be deemed to match and correspond to a same hand of a same person. Continuing the example, if the vectors are greater than the threshold distance from one another, the input images may be deemed to be mismatched.

A second technique utilizes embedding and transformer modules. The first input image associated with the first modality is processed with a first embedding module to determine first representation data in a first embedding space. The second input image associated with the second modality is processed with a second embedding module to determine second representation data in a second embedding space. The first embedding module is processed with the transformer module to transform it into transformed representation data also in the second embedding space. For example, if the first modality is a print image and the second modality is a vein image, the print image is transformed into a vein image. With this second technique, a comparison is made between the transformed representation data and the second representation data. For example, if the vectors corresponding to the transformed representation data and the second representation data are less than a threshold distance of one another, the input images may be deemed to match and correspond to a same hand of a same person. Continuing the example, if the vectors are greater than the threshold distance from one another, the input images may be deemed to be mismatched.

Instead of, or in addition to, the determination of mismatches, these techniques may also be used to determine other information with respect to the input data. In one implementation the techniques may be used to determine if input data associated with a left hand and a right hand are associated with the same person. In another implementation, the techniques may be used to determine if the input data has impaired or inconsistent quality. For example, these techniques may be used to determine that dirt or other obscurant is depicted in some of the input data.

By using these techniques, overall performance of the system is improved. Mismatched data may be discarded from further consideration, reducing demand for computational and memory resources. Matched data may be further processed, with the overall accuracy of that further processing improved as a result.

Illustrative System

FIG. 1 illustrates a system 100 to train and use a mismatch determination module of a biometric recognition system to determine whether input data is mismatched, according to some implementations. The system 100 is described as being used as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires multimodal images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame. However, in some circumstances the first modality image data 114 and the second modality image data 116 may be associated with different hands 102.

A computing device 118 is shown. One or more computing device(s) 118 may execute one or more of the following modules.

During a "training time" training data 120 is used to train a multimodal embedding module 130 to determine representation data 132. In one implementation, the training data 120 may comprise a plurality of first modality and second modality images that have been labeled. For example, label data may indicate the sample identifier, identity label, modality label, and so forth. The training data 120 is discussed in more detail with regard to FIG. 3.

The multimodal embedding module 130 may comprise a machine learning network having several different portions.

As part of the training the multimodal embedding module 130, or portions thereof, determine trained model data that is associated with one or more of the portions of the machine learning network. The machine learning network and the training process are discussed in more detail with respect to FIGS. 2-5.

The multimodal embedding module 130 comprises a machine learning network that includes several portions including one or more backbones, a first embedding portion, an intersection portion, and an XOR portion. The intersection portion facilitates learning to generate representation data that is representative of features present in both modalities. The XOR portion facilitates learning to generate representation data representing features that are distinct or exclusive between the first modality and the second modality. The intersection and XOR are discussed in more detail with regard to FIG. 2.

Once trained, the multimodal embedding module 130, or a portion thereof, may be used at inference to process input such as input image data 112 and provide as output the representation data 132. The operation of the trained multimodal embedding module 130 is discussed in more detail with regard to FIG. 6.

A mismatch determination module 134 may be used to determine if two or more images in the input image data 112 are deemed to be associated with the same hand 102 and are "matched" or if they are deemed to be associated with different hands 102 and are thus "mismatched". The mismatch determination module 134 is discussed in more detail with regard to FIGS. 7 and 10.

During "enrollment time", users are able to utilize the system 100 by performing an enrollment process. An enrollment module 140 may coordinate the enrollment process. Enrollment may associate biometric information, such as representation data 132 with particular information such as a name, account number, and so forth.

During an enrollment process, the user opts in and presents their hand 102 to the scanner 104. The scanner 104 provides input image data 112 to a computing device 118 executing the trained multimodal embedding module 130. The trained multimodal embedding module 130 accepts as input the input image data 112 and provides as output representation data 132. The representation data 132 is representative of at least some of the features depicted in the input image data 112. In some implementations, the representation data 132 may comprise one or more vector values in one or more embedding spaces. The representation data 132 may comprise data associated with one or more intermediate layers or a final layer of the multimodal embedding module 130. In some implementations, the intermediate layer may comprise an initial input layer.

During the enrollment process, the mismatch determination module 134 determines if a mismatch is present in the input image data 112. If no mismatch is determined, the representation data 132 may be processed by the enrollment module 140. If a mismatch is determined a mitigating action may be taken such as acquiring additional input image data 112, discontinuing enrollment, and so forth.

During the enrollment process, the submitted representation data 132 that is deemed to be matched may be checked using an identification module 150 to determine whether the user has been previously enrolled. A successful enrollment may comprise storage of enrolled user data 142 comprising identification data 144, such as name, telephone number, account number, and so forth and storage of one or more of the representation data 132 or data based thereon as enrolled representation data 146. In some implementations, the enrolled representation data 146 may comprise additional information associated with processing of the input image data 112 with the multimodal embedding module 130. For example, the enrolled representation data 146 may comprise data associated with one or more intermediate layers of the multimodal embedding module 130, such as the values of a penultimate layer of one or more portions of the multimodal embedding module 130.

During "identification time" the (as yet unidentified) user presents their hand 102 at the scanner 104. The resulting query input image data 112 may be processed by the (now trained) multimodal embedding module 130 to determine representation data 132. In some implementations, the computing device 106 may execute a trained multimodal embedding module(s) 130. The computing device 106 may perform other functions, such as encryption and transmission of the input image data 112 or data based thereon, such as the representation data 132.

During the identification process, the mismatch determination module 134 determines if a mismatch is present in the input image data 112. If no mismatch is determined, the representation data 132 may be processed by the identification module 150. If a mismatch is determined, a mitigating action may be taken such as acquiring additional input image data 112, discontinuing identification, and so forth.

The identification module 150 executing on the computing device(s) 118 may accept as input the input representation data 132 associated with the input image data 112 acquired by the scanner 104 that is deemed to be matched. The input representation data 132 is compared to previously stored data, such as the enrolled representation data 146 to determine asserted identification data 152. In one implementation, the asserted identification data 152 may comprise a user identifier associated with the closest, in the embedding space(s), previously stored enrolled representation data 146 relative to the input representation data 132 associated with the user who presented their hand 102 during identification time. The identification module 150 may utilize other considerations, such as requiring that the queried representation data 132 is no more than a maximum distance in the embedding space from the enrolled representation data 146 of a particular user before determining the asserted identification data 152.

The asserted identification data 152 may then be used by subsequent systems or modules. For example, the asserted identification data 152, or information based thereon, may be provided to a facility management module 160.

The facility management module 160 may use the asserted identification data 152 to associate an identity with the user as they move about a facility. For example, the facility management module 160 may use data from cameras or other sensors in the environment to determine a location of the user. Given a known path of the user from an entrance that utilizes the scanner 104, the user identity indicated in the identification data 144 may be associated with the user as they use the facility. For example, the now identified user may walk to a shelf, remove an item, and leave the facility. The facility management module 160 may determine the interaction data indicative of the removal of the item as being associated with the user identifier specified in the asserted identification data 152, and bill an account associated with the user identifier. In another implementation, the facility management module 160 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
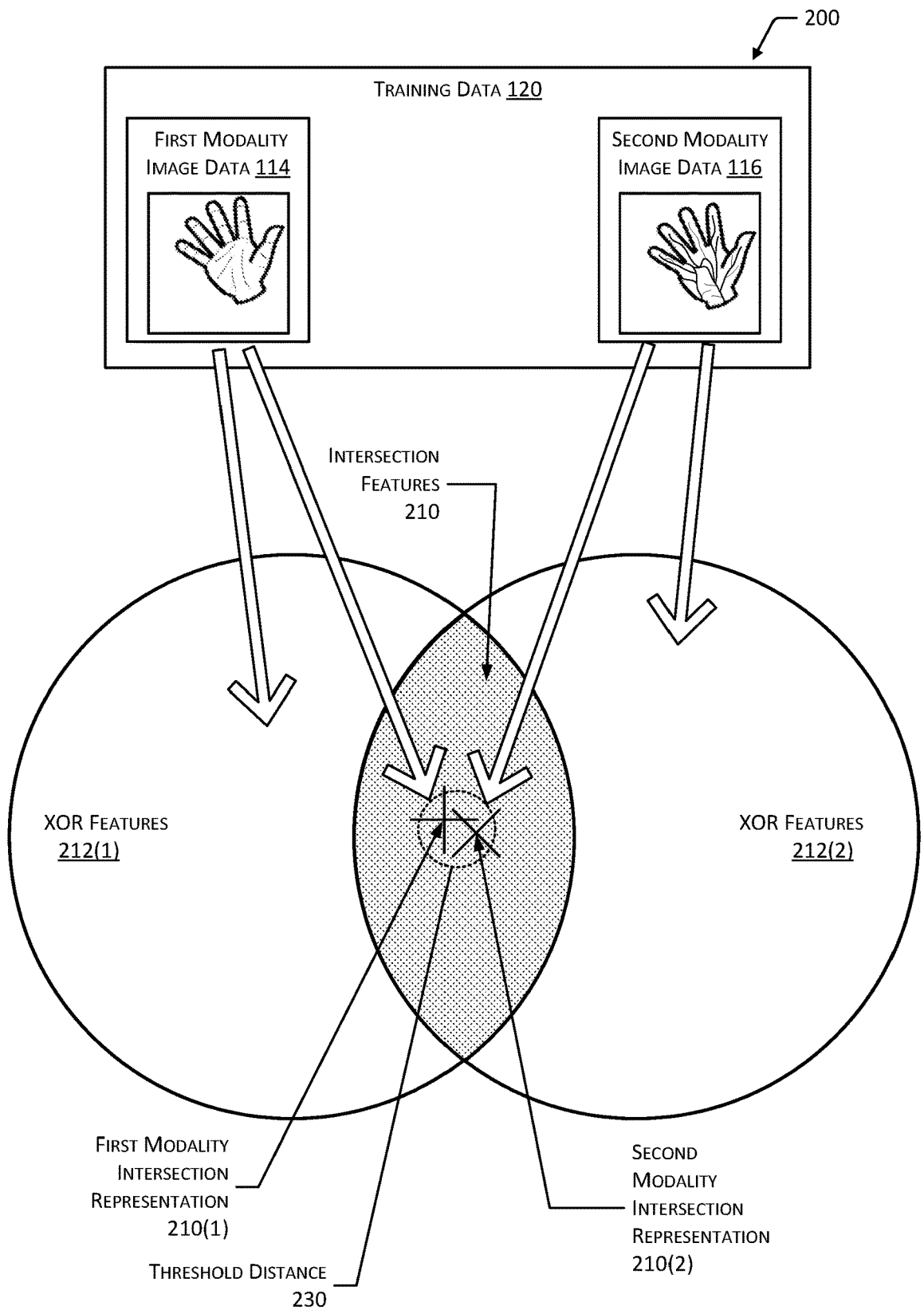
FIG. 2 is a diagram illustrating intersection features and XOR modality features for different modalities, according to some implementations.

FIG. 2 is a diagram 200 illustrating intersection features and XOR modality features for different modalities, according to some implementations. Training data 120 is shown, comprising first modality image data 114 and second modality image data 116. This disclosure describes systems and techniques using two modalities by way of illustration, and not necessarily as a limitation. In some implementations, additional modalities may be used. For example, an Mth modality may be used that comprises a color visible light image such as produced by a red-green-blue (RGB) camera, a thermal image as produced by a thermal imaging camera, or other information.

Depending on the techniques used to acquire an image, images may contain features that are common across two or more modalities (an intersection), or distinct with respect to the other modalities (an exclusive "or", or "XOR"). In the following example, the first modality image data 114 depicts surface features of the hand 102 and the second modality image data 116 depicts subcutaneous features of the hand 102. Some examples of features that are common across both modalities are the overall outline of the hand, deep creases in the palm and joints, and so forth. Features such as these would be represented in the overlap between modalities, shown as the intersection features 210. For example, intersection features associated with a first modality intersection representation 210(1) and a second modality intersection representation 210(2) are depicted. In comparison, a feature that appears in one modality but not in another may be considered distinct or exclusive. The first modality XOR features 212(1) are those features that are distinct to the first modality. The second modality XOR features 212(2) are those features that are distinct to the second modality. Continuing the earlier example, the first modality XOR features 212(1) may include fine details such as friction ridges present on fingers and palm. In comparison, the second modality XOR features 212(2) may include vein patterns beneath the skin.

If the intersection features 210 associated with the first modality intersection representation 210(1) and the second modality intersection representation 210(2) are within a threshold distance 230, they may be deemed to be associated with the same hand 102 of the same user. In contrast, if the intersection features 210 from the different modalities are not within a threshold distance 230, the input image data may be deemed to be associated with different hands 102 of different users.

By training the multimodal embedding module 130 as described herein, the system 100 is able to explicitly utilize information about the intersection features 210 as well as the XOR features 212 to determine the representation data 132. Because the multimodal embedding module 130 is trained utilizing loss values relating to both the intersection and the XOR features, the system learns to decorrelate features that are common across modalities. Colloquially, it may be said that portions of the system learn to extract features that are unique to a particular modality, minimizing learning features that may be present across modalities that are highly correlated.

In some implementations involving three or more modalities (not shown), the system 100 may utilize information for partial intersection features. The partial intersection features comprise those features represented in the overlap between two or more modalities, but less than all modalities. For example, a partial intersection feature may comprise a feature that is represented in two modalities but not the third modality.

Figure 3:
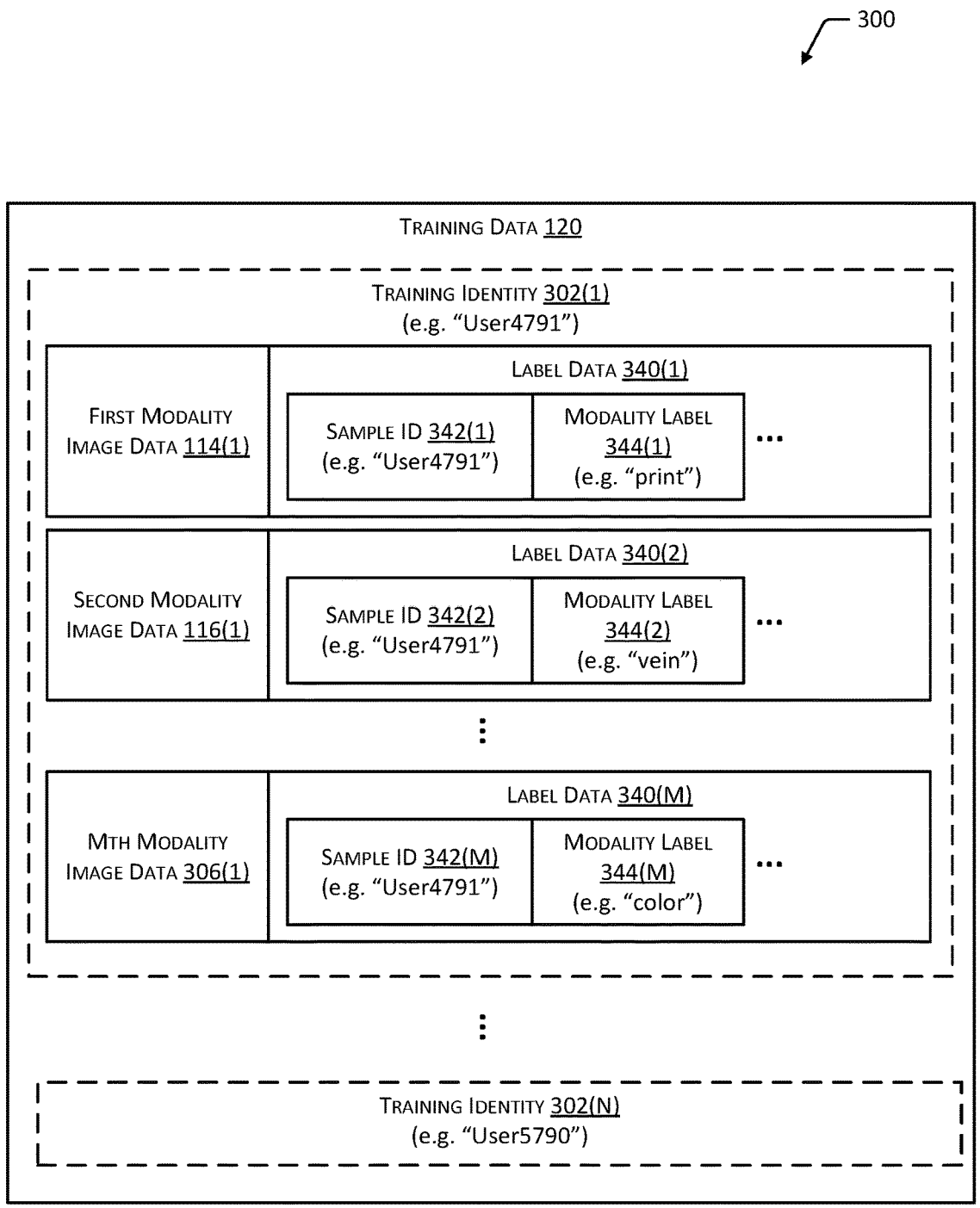
FIG. 3 illustrates training data that is labeled for training of an intersection embedding module in a multimodal embedding module, according to some implementations.

FIG. 3 illustrates at 300 training data 120 that is labeled for training the multimodal embedding module 130, according to some implementations. The training data 120 comprises a plurality of images that are representative of a plurality of training identities, 302(1), 302(2), . . . , 302(N). Each training identity 302 is considered to be unique with respect to the other training identities 302.

The information associated with each training identity 302 may comprise actual image data acquired from users who have opted in to provide information for training, synthetic input data that has been generated, or a combination thereof. In one implementation, the training data 120 may exclude individuals who have enrolled to use of the system for identification. For example, enrolled users having identification data 144 may be excluded from inclusion in the training data 120. In another implementation, some enrolled users may opt in to explicitly permit input image data 112 obtained during enrollment to be stored as training data 120.

The synthetic input data may comprise synthetic data that is consistent with expected input image data 112. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 302(1)-302(N) includes modality image data and associated label data 340. The label data 340 may comprise information such as a sample identifier (ID) 342, modality label 344, and so forth. The sample ID 342 indicates a particular training identity. The sample ID 342 may be used to distinguish one training identity 302 from another. In implementations where actual input data is used as part of the training data 120, the sample ID 342 may be assigned independently of the actual identification data 144 associated with that user. For example, the sample ID 342 may have a value of "User4791" and not the actual identity of "Bob Patel". The modality label 344 indicates whether the associated image data is representative of a first modality, second modality, and so forth.

In this illustration, each training identity 302(1)-302(N) includes first modality image data 114(1) and associated sample ID 342(1) and modality label 344(1), and second modality image data 116(1) and associated sample ID 342(2) and modality label 344(2).

In implementations where additional modalities are used, the training data 120 for a training identity 302 may also include Mth modality image data and associated sample ID 342(M) and modality label 344(M).

Figure 4:
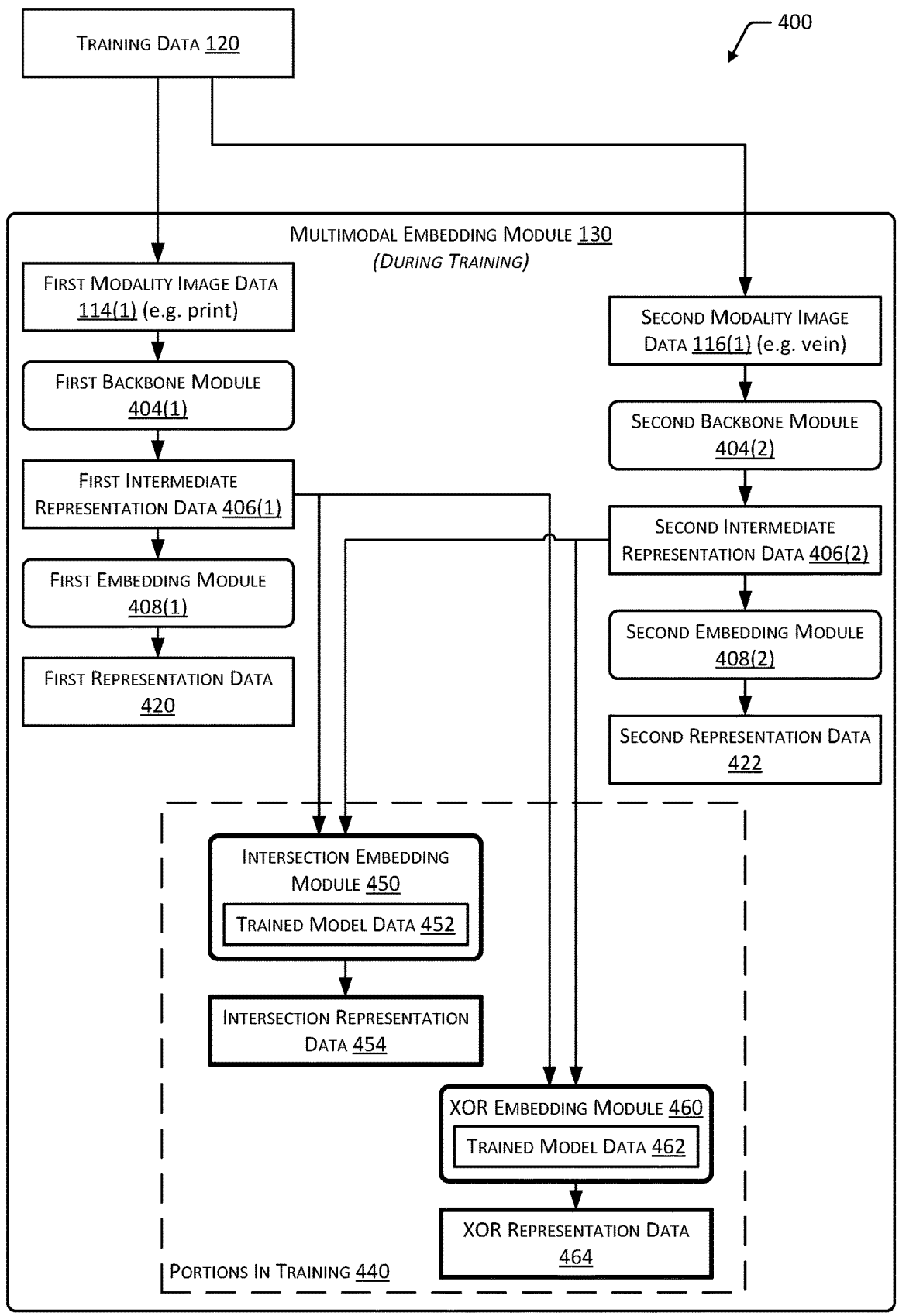
FIG. 4 illustrates a block diagram of a multimodal embedding module that includes the intersection embedding module during training, according to some implementations.

FIG. 4 illustrates a block diagram 400 of a multimodal embedding module 130 that includes the intersection embedding module during training, according to some implementations.

During training, the training data 120 is provided as input to the multimodal embedding module 130. A machine learning network is used to implement the multimodal embedding module 130. The machine learning network may comprise several portions, or branches. In the implementation depicted, portions in training 440 are being trained as specified and discussed below. The remainder of the portions may have been previously trained for their respective functions. In other implementations, one or more portions of the entire machine learning network may be trained during training.

During training, the multimodal embedding module 130 may comprise a first backbone module 404(1), a second backbone module 404(2), a first embedding module 408(1), an intersection embedding module 450 and an XOR embedding module 460. In some implementations, during training the multimodal embedding module 130 may also comprise a second embedding module 408(2).

The backbone module(s) 404 comprise a backbone architecture of an artificial neural network. The backbone module 404 accepts as input the training data 120 and produces intermediate representation data 406. In the implementation shown, the first backbone module 404(1) accepts as input the first modality image data 114 and provides first intermediate representation data 406(1) as output. Also as shown in FIG. 4, the second backbone module 404(2) accepts as input the second modality image data 116 and provides second intermediate representation data 406(2) as output. In some implementations, a single backbone module 404 may be used to process the training data 120 and determine intermediate representation data 406. For example, the same backbone module 404 may be used at different times to determine the intermediate representation data 406 for a respective input.

In one implementation the backbone module(s) 404 may utilize a neural network having at least one layer utilizing an inverted residual with a linear bottleneck. For example, MobileNetV2 implements this architecture. (See "MobileNetV2: Inverted Residuals and Linear Bottlenecks", Sandler, M. et al, 2018 IEEE/CVF Conference on Computer Vision and Pattern Recognition, 18-23 Jun. 2018.)

The first embedding module 408(1) accepts as input the first intermediate representation data 406(1) and determines first representation data 420. For example, the first representation data 420 may be representative of one or more features present in the first modality image data 114. The first representation data 420 may comprise data associated with one or more intermediate layers or a final layer of the first embedding module 408(1) or other portion of the multimodal embedding module 130. In implementations where the first backbone module 404(1) accepts as input the first modality image data 114, the first representation data 420 may be representative of one or more of surface features.

In some implementations, the network may comprise a multiple head network. For example, different heads may be trained to determine or utilize particular features within the training data 120. For example, the first embedding module 408(1) may include or operate in conjunction with another module that provides an additional "head" to determine particular features such as minutiae representing the particular features of friction ridges present on human skin. In another implementation, this portion may be trained to receive and utilize minutiae data determined using another system, such as a minutiae determination algorithm.

The second embedding module 408(2) accepts as input the second intermediate representation data 406(2) and determines second representation data 422. For example, the second representation data 422 may be representative of one or more features present in the second modality image data 116. The second representation data 422 may comprise data associated with one or more intermediate layers or a final layer of the second embedding module 408(2) or other portion of the multimodal embedding module 130. In implementations where the second backbone module 404(2) accepts as input the second modality image data 116, the second representation data 422 may be representative of one or more of subcutaneous features.

The machine learning network of the multimodal embedding module 130 includes an intersection branch as implemented by an intersection embedding module 450 and an XOR branch as implemented by an XOR embedding module 460. In some implementations this provides a joint model training framework. During training, the intersection embedding module 450 and the XOR embedding module 460 utilize respective loss functions to determine loss values. Based on these loss values, the respective portions determine trained model data 452. For example, the intersection embedding module 450 determines trained model data 452 while the XOR embedding module 460 determines trained model data 462. Some implementations of loss functions that may be used are discussed with respect to FIG. 5.

The intersection branch, as implemented by the intersection embedding module 450, processes the first intermediate representation data 406(1) and the second intermediate representation data 406(2) to determine intersection representation data 454 and a loss value. For example, the intersection branch is trained such that first modality and second modality images having the same sample ID 342 value belong to the same class. As a result, after training, the intersection representation data 454 is representative of features depicted in a first modality image and a second modality image that are labeled as having a same identity. The intersection representation data 454 may comprise data associated with one or more intermediate layers or a final layer of the intersection embedding module 450 or other portion of the multimodal embedding module 130.

The XOR branch, as implemented by the XOR embedding module 460, processes the first intermediate representation data 406(1) and the second intermediate representation data 406(2) to determine XOR representation data 464 for each modality being trained. Each modality of a sample ID 342 may be assigned a different class label for training on the XOR branch. The XOR embedding module 460 is trained such that first modality and second modality images with the same sample ID 342 value belong to different classes. As a result, after training, the XOR representation data 464 is representative of features that are depicted in a particular modality and not in the other modalities. For example, the XOR representation data 464 is associated with features that are not in both the first modality image and the second modality image. The XOR representation data 464 may comprise data associated with one or more intermediate layers or a final layer of the XOR embedding module 460 or other portion of the multimodal embedding module 130.

In the implementation shown, there are two modalities in use, resulting in XOR representation data 464 that is associated with the first modality and the second modality. For example, during training, when the first intermediate representation data 406(1) is associated with an input image having a modality label 344 indicating the first modality, the XOR branch determines the first modality XOR representation data 464(1). Continuing the example, when the second intermediate representation data 406(2) is associated with an input image having a modality label 344 indicating the second modality, the XOR branch determines the second modality XOR representation data 464(2).

During training, the loss values determined by the respective loss functions are used to determine the trained model data. For example, trained model data 452 is determined for the intersection embedding module 450 while trained model data 462 is determined for the XOR embedding module 460.

In some implementations, one or more of the backbone module(s) 404 may be omitted and the input data may be processed by one or more of the embedding module(s) 408. For example, the first modality image data 114 may be provided as input to the first embedding module 408(1), the intersection embedding module 450, and the XOR embedding module 460. Continuing the example, the second modality image data 116 may be provided as input to the second embedding module 408(2), the intersection embedding module 450, and the XOR embedding module 460.

Figure 5:
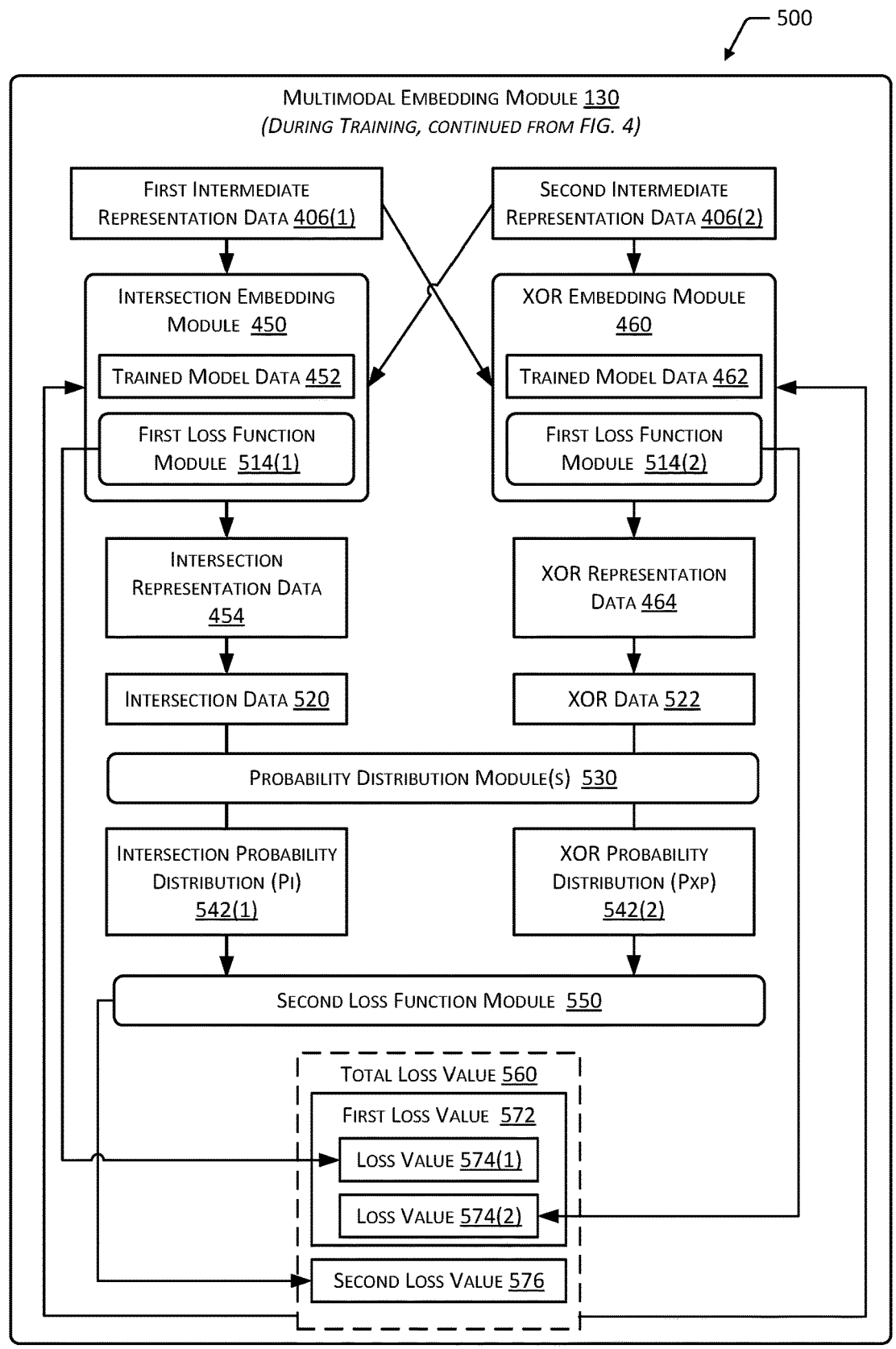
FIG. 5 illustrates a block diagram of loss functions used during training of the intersection embedding module of the multimodal embedding module, according to some implementations.

FIG. 5 illustrates at 500 a block diagram of the portions in training 440 and their associated loss functions used during training of the multimodal embedding module 130, according to some implementations. As described with respect to FIG. 4, training may be performed to train the intersection embedding module 450 and the XOR embedding module 460, with the remaining modules of the multimodal embedding module 130 not being trained.

The intersection embedding module 450 includes a first loss function module 514(1). The XOR embedding module 460 includes another first loss function module 514(2). The first loss function modules 514(1) and 514(2) determine loss values 574. The branches utilize the label data 340 during training. The loss values 574 may also be provided to the second loss function module 550.

In one implementation, the first loss function module 514 may utilize a hyperspherical loss function as shown with regard to equations 1 and 2. In other implementations, other loss functions may be used. For example, other functions such as Softmax, Cosine, AM-Softmax, Arcface, large margin cosine loss, and so forth may be used.

The hyperspherical loss (HSL) function minimizes L which is the sum of a cross-entropy term, and a regularization term to regularize the confidence score (weighted by λ). $W_j$ denotes a classifier weight for $j^{th}$ class. C is the total number of training classes. M is the minibatch size. In these equations m is a fixed angular margin. $\hat{W}$ and $\hat{x}$ are the unit-normalized form of W and x respectively. Also in these equations, $x_i$(embedding vector of input i) and $s_i$ are both outputs of the respective modules such as the intersection embedding module 450 and the XOR embedding module 460, where $s_i$ is used only during training.

$$L = -\frac{1}{M}\sum_{i=1}^{M}\left(\log p_i - \lambda s_i^2\right) \quad \text{(Equation 1)}$$

$$p_i = \frac{e^{S_i\left(\hat{W}_{y_i}^T \hat{x}_i - m\right)}}{e^{S_i\left(\hat{W}_{y_i}^T \hat{x}_i - m\right)} + \sum_{j=1, j\neq y_i}^{C} e^{\hat{W}_j^T \hat{x}_i}} \quad \text{(Equation 2)}$$

$$p_i = \frac{e^{S_i\left(\hat{W}_{y_i}^T \hat{x}_i - m\right)}}{e^{S_i\left(\hat{W}_{y_i}^T \hat{x}_i - m\right)} + \sum_{j=1, j\neq y_i}^{C} e^{\hat{W}_j^T \hat{x}_i}}$$

During training the intersection embedding module 450 may determine the intersection representation data 454, one or more parameters of the intersection representation data 454, and so forth. For example, the one or more parameters may comprise weights for one or more classes. The intersection representation data 454 and associated one or more parameters may be stored as intersection data 520. During training, the XOR embedding module 460 may determine a plurality of the first modality XOR representation data 464(1) and the second modality XOR representation data 464(2), and one or more parameters of the XOR representation data 464. The XOR representation data 464 and associated one or more parameters may be stored as XOR data 522. Once training is complete, one or more of the intersection data 520 or XOR data 522 may be deleted or otherwise discarded.

A probability distribution module 530 processes the data 520-522 to determine a set of probability distributions. The intersection data 520 is processed to determine an intersection probability distribution (Pi) 542(1). The XOR data 522 is processed to determine an XOR probability distribution (Pxp) 542(2).

A second loss function module 550 accepts the probability distributions 542 and determines a second loss value 576. In one implementation, the second loss function module 550 may implement a Jensen-Shannon Divergence (JSD) loss function. The JSD loss function measures similarity between two probability distributions. For two probability distributions 542 P and Q, JSD may be defined in one implementation with the following equation:

$$JSD(P\|Q)=0.5*(D)P\|M)+D(Q\|M)) \quad \text{(Equation 3)}$$

where $M=(P+Q)/2$, D is the Kullback-Leibler Divergence(KLD)

Unlike KLD, JSD(P∥Q)=JSD(Q∥P), which allows JSD to be used as a distance metric for probability distributions. It is desired that the values of the probability distributions 542 of incorrect classes for the intersection (I) and XOR (Xp) have values that differ from one another, implicitly ensuring decorrelation.

Given an image x for identity c, the joint model training framework described above and using a first loss function such as hyperspherical loss, determines the set of probability distributions 542: the intersection probability distribution (Pi) 542(1) and the XOR probability distribution (Pxp) 542(2). For example, the loss values 574 determined by the first loss function module(s) 514 may be used as input to the JSD loss function. These probability distributions are N dimensional, where N is the number of training identities 302(N). This can be expressed with the following equations:

$$Pi=[pi\_1,pi\_2, \ldots, pi\_N] \quad \text{(Equation 4)}$$

$$Pxp=[pxp\_1, pxp\_2, \ldots, pxp\_N] \quad \text{(Equation 5)}$$

From each of these probability distributions 542, the entry corresponding to the correct identity c is removed, and the vector is normalized to get (N-1) dimensional probability distribution of incorrect classes Pi_n, Pxp_n, as shown in the following equations:

$$Pi\_n=[pi\_1,pi\_2, \ldots, pi\_c-1,pi\_c+1, \ldots, pi\_N]/\\(1-pi\_c) \quad \text{(Equation 6)}$$

$$Pxp\_n=[pxp\_1,pxp\_2, \ldots, pxp\_c-1, pxp\_c+1, \ldots \\ pxp\_N]/(1-pxp\_c) \quad \text{(Equation 7)}$$

$$Pxp\_n=[pxp\_1,pxp\_2, \ldots, pxp\_c-1, pxp\_c+1, \ldots \\ pxp\_N]/(1-pxp\_c)$$

The JSD loss then minimizes the following equation:

$$JSD\_Loss=-1.0*(JSD(Pi\_n\|Pxp\_n)) \quad \text{(Equation 8)}$$

$$JSD\_Loss=-1.0*(JSD(Pi\_n\|Pxp\_n))$$

A total loss value 560 is calculated based on the first loss values 572 and the second loss value 576. For example, the total loss value 560 may be calculated using the following equation:

$$\text{Total Loss} = \text{Hyperspherical\_loss} + \text{loss\_weight} * \text{JSD\_loss} \quad \text{(Equation 9)}$$

Total Loss=Hyperspherical_loss+ loss_weight*JSD_loss

The total loss value 560 may then be provided to the one or more of the intersection embedding module 450 or the XOR embedding module 460 for subsequent iterations during training. As a result of training, the trained model data 452 and 462, respectively, is determined. For example, the trained model data may comprise weight values, bias values, threshold values, and so forth that are associated with particular nodes or functions within the multimodal embedding module 130. Once trained, the multimodal embedding module 130 may be used to determine representation data 132 for subsequent use.

Figure 6:
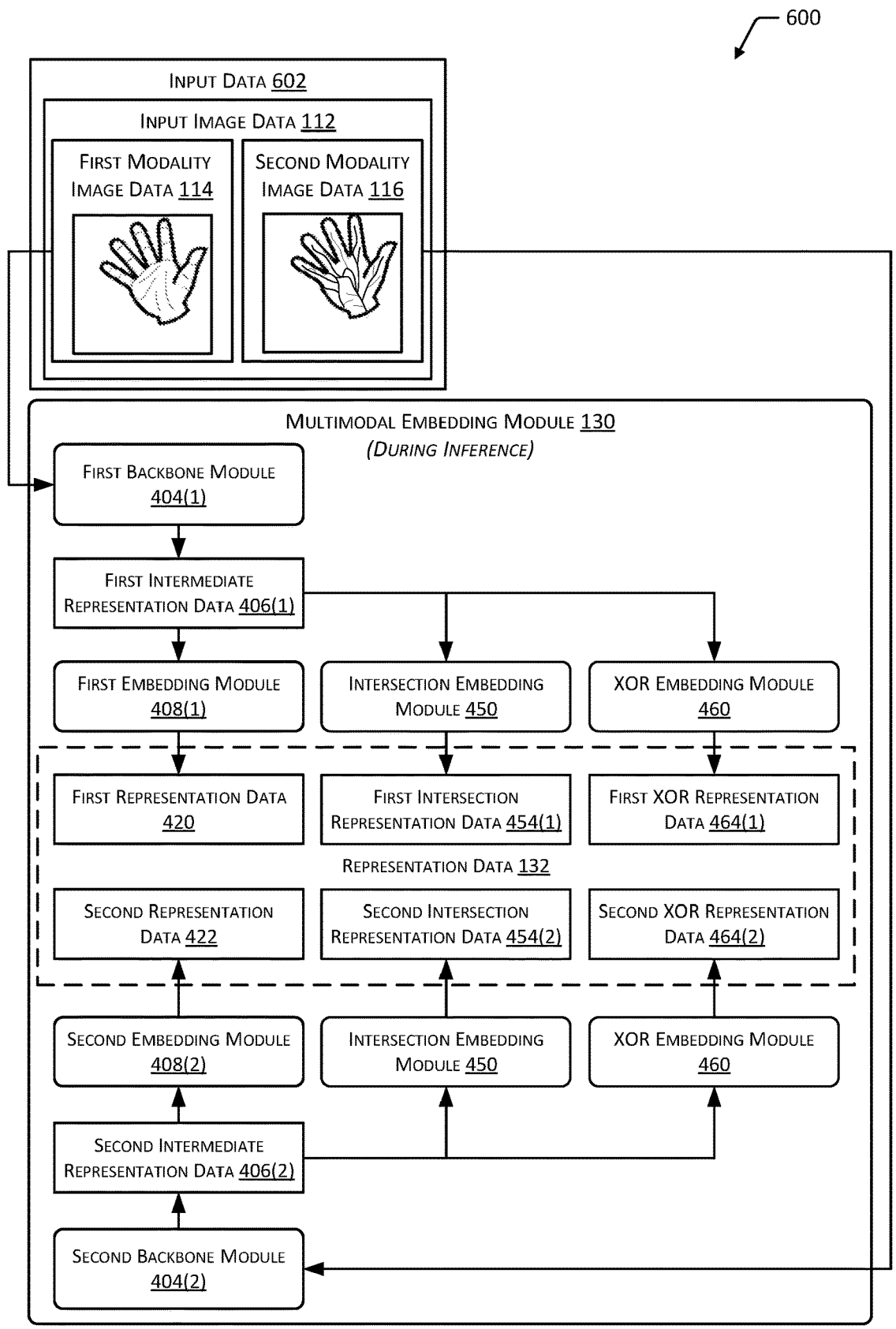
FIG. 6 illustrates a block diagram of the multimodal embedding module during inference, according to some implementations.

FIG. 6 illustrates at 600 a block diagram of the multimodal embedding module 130 during inference, according to some implementations.

Once the portions in training 440 have been trained as described above, during inference a subset of the machine learning network may be used. In the implementation depicted here, the multimodal embedding module 130 during inference may comprise the first backbone module 404(1), the first embedding module 408(1), the second backbone module 404(2), the second embedding module 408(2), and the intersection embedding module 450. During operation, input data 602 such as input image data 112 comprising first modality image data 114 and second modality image data 116 is provided to the trained multimodal embedding module 130.

The first backbone module 404(1) may process the first modality image data 114 to determine the first intermediate representation data 406(1). The first intermediate representation data 406(1) is processed by the first embedding module 408(1) to determine the first representation data 420. The first intermediate representation data 406(1) is processed by the intersection embedding module 450 to determine the first intersection representation data 454(1).

In some implementations, the first intermediate representation data 406(1) may be processed by the XOR embedding module 460 to determine the first XOR representation data 464(1).

The second backbone module 404(2) may process the second modality image data 116 to determine the second intermediate representation data 406(2). The second intermediate representation data 406(2) is processed by the second embedding module 408(2) to determine the second representation data 422. The second intermediate representation data 406(2) is processed by the intersection embedding module 450 to determine the second intersection representation data 454(2).

In some implementations, the second intermediate representation data 406(2) may be processed by the XOR embedding module 460 to determine the second XOR representation data 464(2).

The representation data 132 may comprise one or more of the first representation data 420, the second representation data 422, the first intersection representation data 454(1), the second intersection representation data 454(2), the first XOR representation data 464(1), or the second XOR representation data 464(2). The resulting representation data 132 may be used in subsequent processes, such as to determine if the first modality image data 114 and the second modality image data 116 are matched or mismatched, enrollment, identification, and so forth. The representation data 132 may comprise data associated with one or more intermediate layers or a final layer of the multimodal embedding module 130.

In some implementations, one or more of the backbone module(s) 404 may be omitted and the input data 602 may be processed by one or more of the embedding module(s) 408. For example, the first modality image data 114 may be provided as input to the first embedding module 408(1), the intersection embedding module 450, and the XOR embedding module 460. Continuing the example, the second modality image data 116 may be provided as input to the second embedding module 408(2), the intersection embedding module 450, and the XOR embedding module 460.

In addition to those mentioned above, once trained, a deployed implementation of the multimodal embedding module 130 may omit one or more other modules that are used during training and not during inference. For example, the multimodal embedding module 130 may omit the first loss function modules 514, the probability distribution module 530, the second loss function module 550, and so forth.

Figure 7:
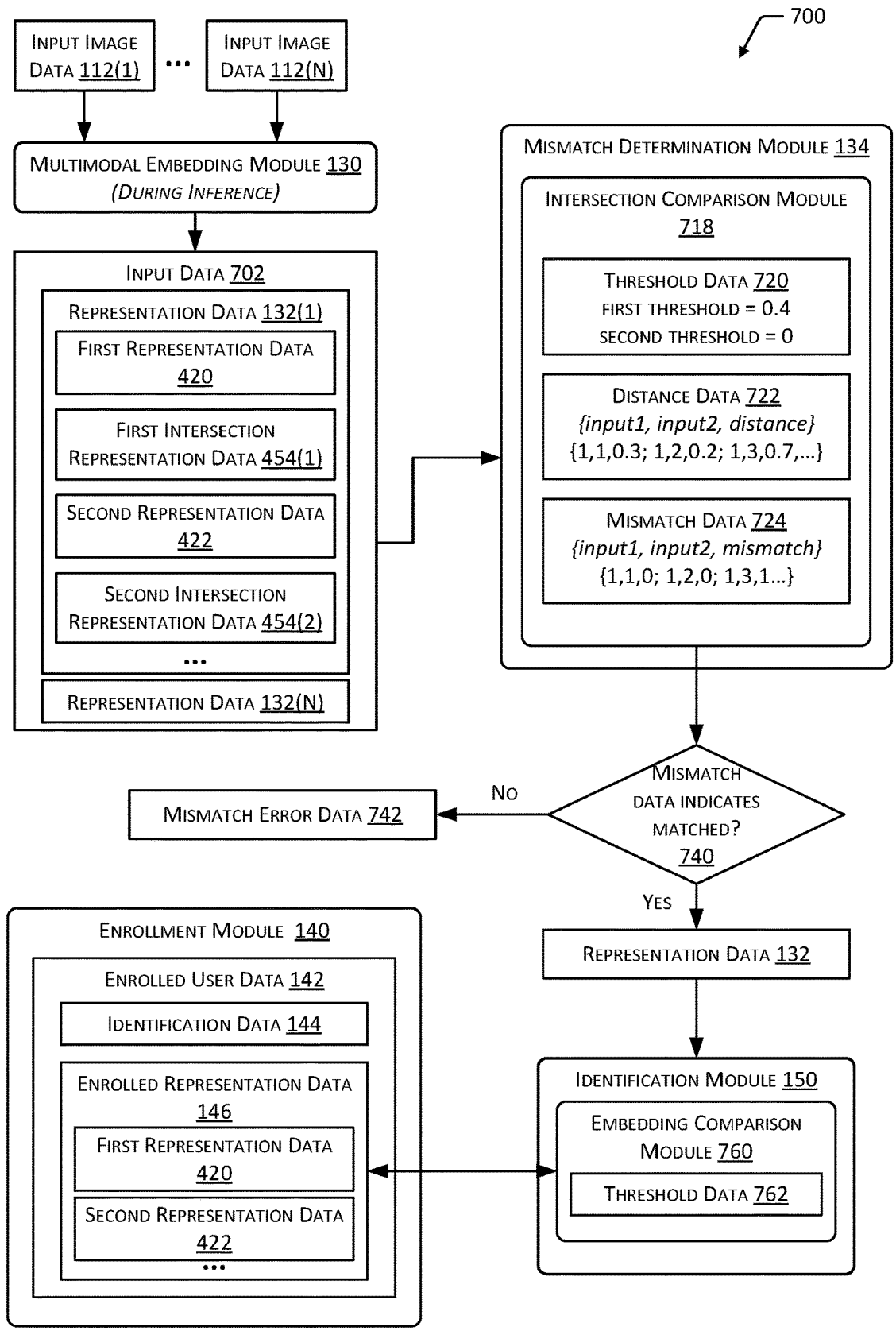
FIG. 7 illustrates a block diagram of a mismatch determination module used with an enrollment module, according to some implementations.

FIG. 7 illustrates a block diagram 700 of the mismatch determination module 134 used with an enrollment module 140, according to some implementations.

In this illustration, input data 702 comprises representation data 132 that has been acquired, such as during an enrollment process. In some implementations, a plurality of instances of input image data 112(1)-(N) may be acquired. For example, the input data 702 may comprise ten pairs of first modality image data 114 and second modality image data 116 that has been acquired from a user who has opted in to enroll in the use of the system 100. The input data 702 may comprise one or more of instances of representation data 132(1)-(N), each instance comprising the first representation data 420, the first intersection representation data 454(1), the second representation data 422, or the second intersection representation data 454(2).

The input data 702, or a portion thereof, may be processed by the mismatch determination module 134. In the implementation shown here, the mismatch determination module 134 comprises an intersection comparison module 718. The intersection comparison module 718 is configured to accept as input the first intersection representation data 454(1) and the second intersection representation data 454(2) and determines mismatch data 724. The intersection representation data 454 associated with one or more instances of representation data 132(1)-(N) in the input data 702 may be provided to the intersection comparison module 718. In some implementations, the intersection comparison module 718 may compare each instance of first intersection representation data 454(1) with each instance of second intersection representation data 454(2). Continuing the earlier example, if ten instances of input image data 112(1)-(10) are processed, each comprising a first modality image and a second modality image, up to 10×10 or 100 comparisons may be performed. Mismatch data 724 may be determined for each comparison. Continuing the example, the mismatch data 724 may comprise a set of 100 values, each associated with a particular combination of the instances of input image data 112(1)-(10).

In one implementation shown here, the intersection comparison module 718 may determine distance data 722 indicative of a distance in an intersection embedding space between a given combination of the first intersection representation data 454(1) and the second intersection representation data 454(2). For example, the distance data 722 may be calculated as a cosine distance between the first intersection representation data 454(1) and the second intersection representation data 454(2). The distance data 722 may be compared to a first threshold value specified by threshold data 720 to determine the mismatch data 724. For example, if the distance data 722 indicates a distance that is less than the first threshold value, the input data 702 may be deemed to be "matched" in that the input image data 112 is associated with a same hand 102. In another example, if the distance data 722 indicates a distance that is greater than or equal to the threshold value, the input data 702 may be deemed to be "mismatched" in that the input image data 112 is associated with different hands 102.

In this illustration, the distance data 722 includes example information indicating some of the combinations of the first intersection representation data 454(1) and the second intersection representation data 454(2) and the calculated distances between that pair of inputs. Also shown is an example of the mismatch data 724, including a binary mismatch value for each of the assessed pairs of inputs. In this example, a mismatch value of 0 indicates a match while 1 indicates a mismatch. In this illustration, the third combination of first intersection representation data 454(1) and the second intersection representation data 454(2) is indicative of a mismatch, as the associated distance indicated by the distance data 722 for that pair exceeds the first threshold.

In another implementation the intersection comparison module 718 may include a classifier or other machine learning system that may be trained to accept the first intersection representation data 454(1) and the second intersection representation data 454(2) as input and provide as output mismatch data 724 indicative of a classification of "{matched}" or "{mismatched}". In some implementations, the classifier may also be trained using one or more of the first representation data 420, the second representation data 422, the XOR representation data 464(1) or 464(2), and so forth. In some implementations the threshold data 720 may specify one or more thresholds associated with operation of the classifier. For example, the threshold data 720 may specify a minimum confidence value to be used to provide output.

At 740 the mismatch data 724 is assessed. If at 740 the mismatch data 724 indicates the input data 702 is not matched (mismatched), the process may proceed to 742. At 742 mismatch error data is generated. In some implementations one or more actions may be performed. For example, the system 100 may present an error to the user, discontinue the process, and so forth.

If at 740 the mismatch data 724 indicates the input data 702 is matched, the process may proceed to send the representation data 132 to another module. For example, if the mismatch data 724 indicates that all distances for combinations of the first intersection representation data 454(1) and the second intersection representation data 454(2) are less than the first threshold, the input data 702 may be deemed to match or correspond to the same user. In this illustration, the representation data 132 that has been deemed to be "matched" is provided to the enrollment module 140 for further processing.

In some implementations involving processing of a plurality of input image data 112, such as during enrollment, a second threshold may be specified as to a maximum permitted number of mismatches. Continuing the earlier example, if a plurality of input image data 112 is acquired and used to determine the input data 702, mismatch data 724 may be determined for various combinations of the first intersection representation data 454(1) and the second intersection representation data 454(2). In one implementation, the second threshold may be set to zero. As a result, if the mismatch data 724 indicates a count of mismatches for any one of the 100 instances of mismatch data 724 is greater than the second threshold of 0, the entire set of input data 702 may be discarded, and the process may proceed to 742. Contrariwise, if the count of mismatches in the mismatch data 724 is zero, the process may continue.

During enrollment, the identification module 150 may be used to query the previously stored enrolled user data 142 and determine if the user being enrolled has previously enrolled. If the user is deemed to have been previously enrolled, additional enrollment may be denied.

The identification module 150 may comprise an embedding comparison module 760 that compares the representation data 132 to the previously stored enrolled representation data 146. The embedding comparison module 760 may perform a plurality of comparisons among the various embedding spaces. For example, a comparison of the first representation data 420 may be performed to determine a first set of closest first embeddings in the enrolled user data 142. In another example, a comparison of the query intersection representation data 454 may be performed to determine a second set of closest intersection embeddings in the enrolled user data 142. In yet another example, a comparison of the query XOR representation data 464 may be performed to determine a third set of closest XOR embeddings in the enrolled user data 142. These comparisons may be assessed using threshold data 762 to determine one or more enrolled identities that are closest. For example, the top k entries may comprise the top k entries that are less than a maximum distance in all of the respective embedding spaces, wherein k and the maximum distance are specified in the threshold data 762.

If the identification module 150 determines that the user attempting to enroll is deemed to not have previously enrolled, enrolled user data 142 may be determined for the user. For example, the representation data 132 or a portion thereof provided by the user during the enrollment process may be stored as the enrolled representation data 146. Other information such as identification data 144 provided by the user may be stored and associated with the enrolled representation data 146.

In another example, the mismatch determination module 134 may be used for other processes, such as during identification. Once a user has been enrolled, the system 100 may be queried to assert an identity of the user. During a query operation query input data is provided and processed. The query input data may be processed by the mismatch determination module 134. If the mismatch determination module 134 determines that the query input data is indicative of mismatched query input data, error data may be generated, one or more mitigating actions may be taken, and so forth. If the mismatch determination module 134 determines that the query input data is indicative of matched query input data, the query input data may be processed by the identification module 150 to determine asserted identification data 152.

In another implementation, the mismatch determination module 134 may be used for other processes, such as assessing whether the input data 702 is of suitable quality. In this implementation, based on the first intersection representation data 454(1) and the second intersection representation data 454(1), the system 100 may determine quality data that is indicative of one or more of: over- or under-exposure of a first input image, over- or under-exposure of a second input image, obscuration of at least a portion of the first input image, obscuration of at least a portion of the second input image, blurring of the first input image, blurring of the second input image, and so forth. For example, dirt on a hand 102 may be visible in the first modality image data 114 and not be visible in the second modality image data 116. The comparison of the resulting intersection representation data 454(1) and 454(2) with a first threshold may indicate that the images are of the same hand 102, while a second threshold may indicate that there is a discrepancy between the two images. Based on the discrepancy, remedial action may be taken, such as prompting the user to provide additional input image data 112, generating an error message, and so forth.

The mismatch determination module 134 may be used in other implementations to determine other information about the input data 602. In one implementation the system 100 may be used to determine if a left hand and a right hand are associated with the same person. In this implementation input image data 112 for a left and a right hand are acquired and processed as described above. Based on image data acquired from a left hand a first pair of the first intersection representation data 454(1)(1) and the second intersection representation data 454(2)(1) may be determined. Based on image data acquired from a right hand a second pair of the first intersection representation data 454(2)(2) and the second intersection representation data 454(2)(2) may be determined. This set of intersection representation data 454 may be compared. For example, a maximum distance between any of the embeddings is less than a threshold distance, the images of the left and right hands may be deemed to be associated with a same person.

The mismatch determination module 134 may be used in other implementations to determine other information about the input data 602. Many failure modes may manifest as a mismatch. For example, a flap of skin obscuring part of the hand 102 during image acquisition may result in a mismatch. In another example, presentation of an artifact such as a false hand may result in a mismatch. In one implementation the system 100 may be used to determine if an unusual or out of distribution condition has occurred based on the operation of the mismatch determination module 134. In this implementation, one or more of the input data 702, distance data 722, or mismatch data 724 may be analyzed to determine if an unexpected event has occurred. Such analysis may include, but is not limited to, statistical analysis, frequency analysis, and so forth. Once an unexpected event has been detected, additional information about the unexpected event may be processed to determine subsequent mitigation. Such mitigation may be implemented across the entire system 100, applied to particular sets or instances of enrolled user data 142, and so forth.

In another implementation, the mismatch determination module 134 may be used to determine a hardware fault in a scanner 104. In this implementation, based on comparing data from a plurality of instances of the first intersection representation data 454(1) and the second intersection representation data 454(1), the system 100 may determine a hardware fault in the scanner 104 has occurred. For example, if a plurality of instances of input image data 112 (such as ten frames each) for a plurality of hands 102 may be acquired and processed. If the number of mismatches detected exceeds a threshold value, a hardware fault may be deemed to have occurred at the scanner 104. For example, if every set of input image data 112 is deemed to be mismatched, this may be due to a failure of one or more light sources in the scanner 104. Once a fault has been detected, mitigating actions may be performed. For example, the system 100 may remotely deactivate the scanner 104, operate the scanner 104 to present output indicative of the fault, may generate an error message indicative of the hardware fault, and so forth.

Figure 8:
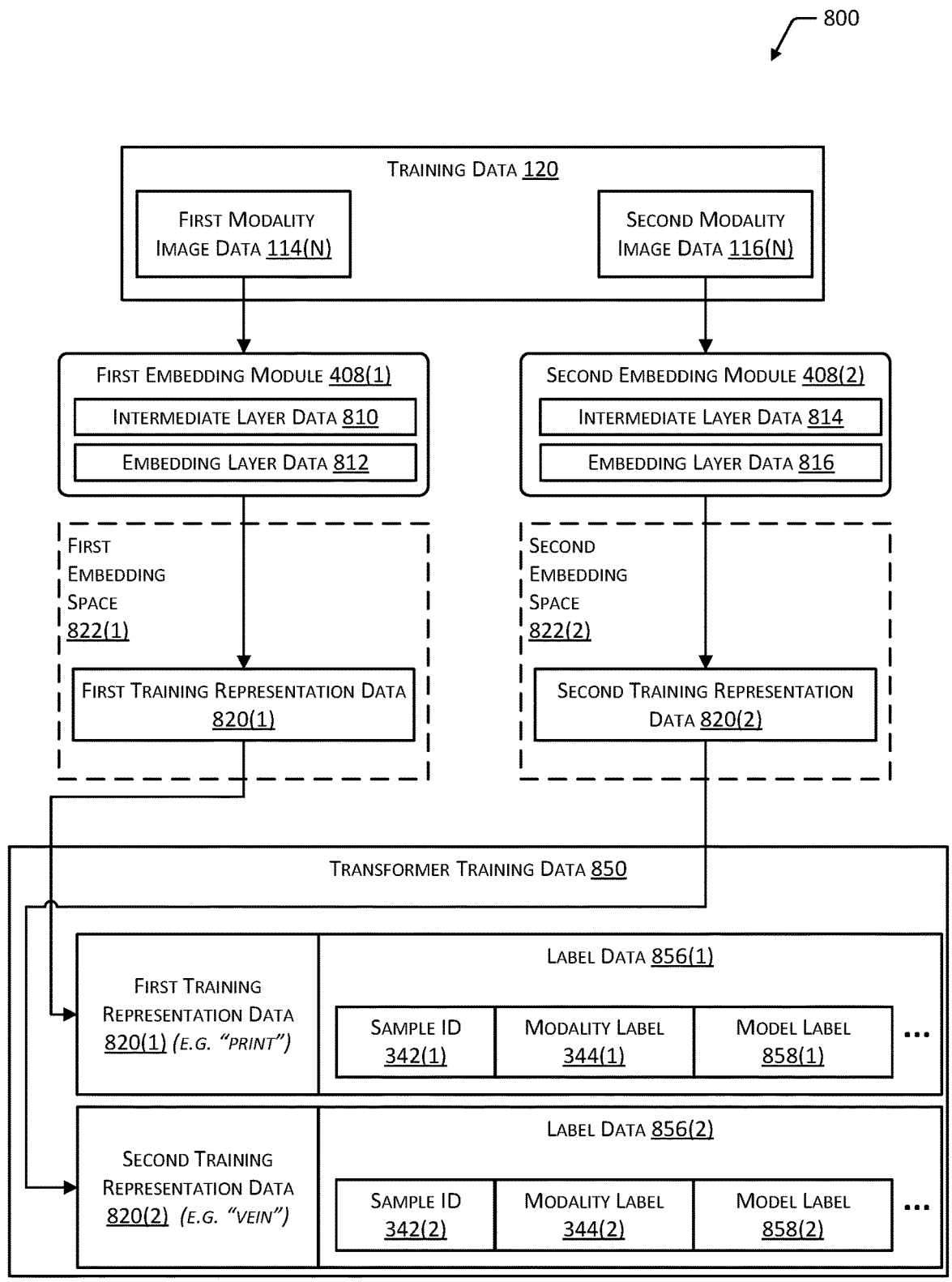
FIG. 8 illustrates processing training data to determine transformer training data, according to some implementations.

FIG. 8 illustrates at 800 a method of processing training input data to determine transformer training data 850, according to some implementations. The preparation of transformer training data 850 may be implemented by one or more computing devices 118. Transformer training data 850 is acquired for use in training a transformer module 902 as described with respect to FIG. 9.

Training data 120, as described above, is shown. The training data 120 may comprise one or more of actual input image data 112 with associated label data 340 or synthetic input data with associated label data 340.

The training data 120 is processed by at least two embedding modules 408. The first modality image data 114 is processed by the first embedding module 408(1) to determine first training representation data 820(1) in a first embedding space 822(1). In some implementations, the first training representation data 820(1) comprises, or is based on, intermediate layer data 810 and embedding layer data 812. The intermediate layer data 810 may comprise values associated with one or more layers of the first embedding module 408(1) while processing input. The embedding layer data 812 comprises the representation data 132 that is provided by output of the first embedding module 408(1). In one implementation, the intermediate layer data 810 may comprise values of a penultimate layer of a neural network of the first embedding module 408(1). The penultimate layer may comprise the layer preceding the final output of the embedding layer data 812. In one implementation, the intermediate layer data 810 may comprise the values of a fully connected linear layer that precedes the output of the embedding layer data 812. For example, the embedding layer data 812 may have a vector of size 128, while the intermediate layer data 810 has a vector of size of 1280.

Continuing the implementation discussed above, the first training representation data 820(1) may comprise a concatenation of the intermediate layer data 810 and the embedding layer data 812. In other implementations, the intermediate layer data 810 and the embedding layer data 812 may be otherwise combined.

In some implementations, use of the intermediate layer data 810 results in a substantial improvement in overall performance of the system 100.

The second modality image data 116 is processed by the second embedding module 408(2) to determine second training representation data 820(2) in a second embedding space 822(2). This pair of training representation data 820(1) and 820(2) may be associated with one another by a common value of sample ID 342. This pair is thus representative of the same input data, from the training data 120, as expressed in two different embedding spaces. Each instance of training representation data 820 may have associated with label data 856. This associated label data 856 may comprise the modality label 344 and a model label 858 that is indicative of the embedding module 408 used to generate the particular training representation data 820.

In some implementations, the second training representation data 820(2) comprises, or is based on, intermediate layer data 814 and embedding layer data 816. The intermediate layer data 814 may comprise values associated with one or more layers of the second embedding module 408(2) while processing input. The embedding layer data 816 comprises the representation data that is provided by output of the second embedding module 408(2). In one implementation, the intermediate layer data 814 may comprise values of a penultimate layer of a neural network of the second embedding module 408(2). The penultimate layer may comprise the layer preceding the final output of the embedding layer data 816. In one implementation, the intermediate layer data 814 may comprise the values of a fully connected linear layer that precedes the output of the embedding layer data 816. For example, the embedding layer data 816 may have a vector of size 128, while the intermediate layer data 814 has a vector of size of 1280.

Continuing the implementation discussed above, the second training representation data 820(2) may comprise a concatenation of the intermediate layer data 814 and the embedding layer data 816. In other implementations, the intermediate layer data 814 and the embedding layer data 816 may be otherwise combined.

In some implementations, use of the intermediate layer data 814 results in a substantial improvement in overall performance of the system 100.

The transformer training data 850, comprising first training representation data 820(1), second training representation data 820(2), and associated or implied label data 856 may be used to train a transformer module 902, as described next.

Figure 9:
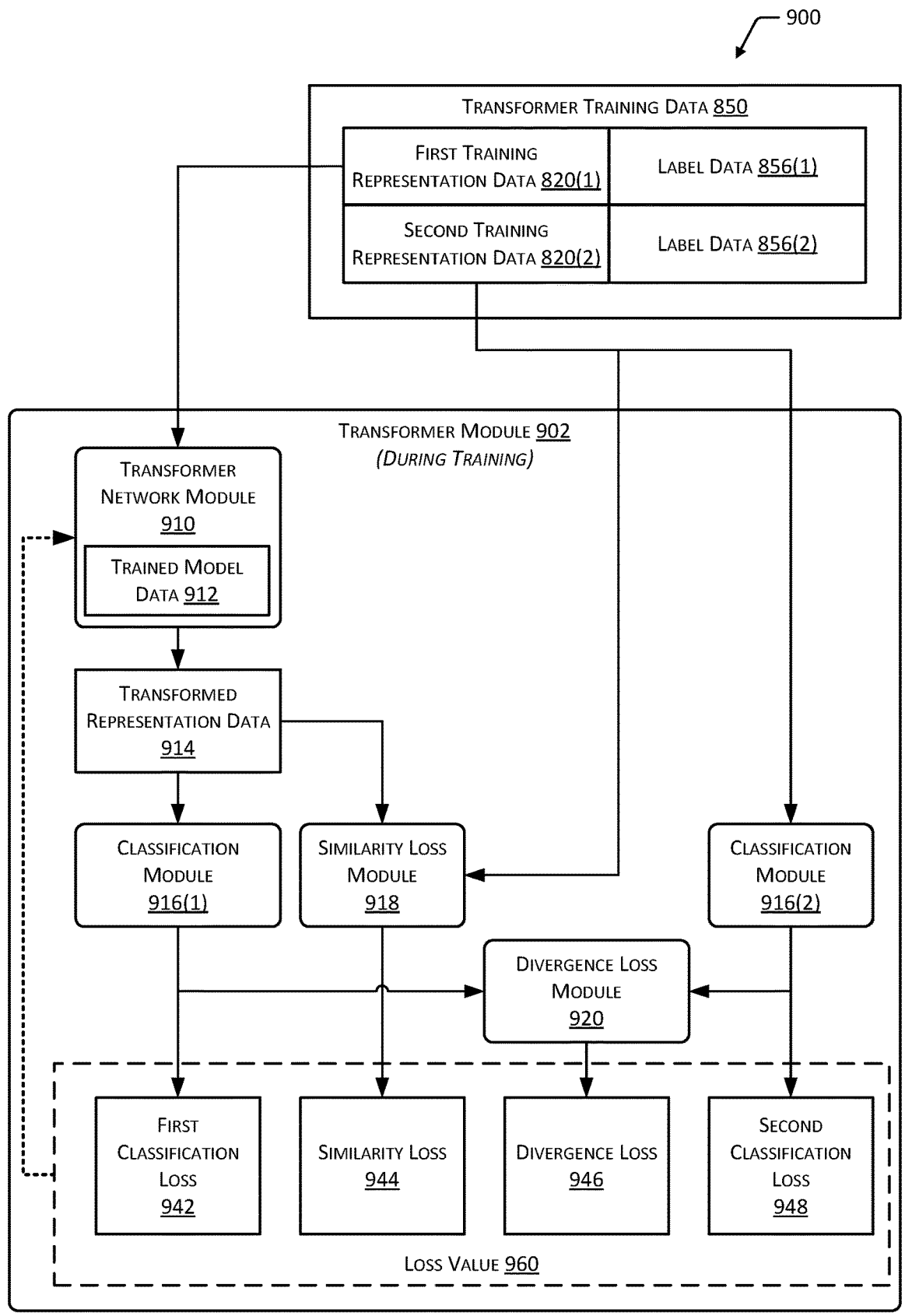
FIG. 9 illustrates a transformer module during training, according to some implementations.

FIG. 9 illustrates at 900 a transformer module 902 during training, according to some implementations. The transformer module 902 may be implemented by one or more computing devices 118. The transformer module 902 comprises a transformer network module 910, classification modules 916, similarity loss module 918, and a divergence loss module 920.

The transformer network module 910 may comprise a neural network. During training, the transformer network module 910 accepts as input first training representation data 820(1), associated with a first embedding space 822, and produces as output transformed representation data 914. As training progresses, the quality of the resulting transformed representation data 914 may be expected to improve due to the loss values 960 that are returned as described below.

In some implementations the transformer network module 910 may comprise one or more multilayer perceptrons (MLP). Trained model data 912 associated with operation of the transformer network module 910 is determined during training. For example, the trained model data 912 may comprise one or more of weight values, bias values, and so forth associated with operation of portions of the neural network.

The transformed representation data 914 is processed by a first classification module 916(1) to determine a first classification loss 942. In one implementation, the classification module 916 may utilize a HyperSpherical loss function as shown with regard to equations 1 and 2. In other implementations, other classification loss functions may be used. For example, other classification functions such as Softmax, Cosine, AM-Softmax, Arcface, large margin cosine loss, and so forth may be used.

The HyperSpherical Loss (HSL) function may also be used during training of the multimodal embedding module 130. The HSL loss minimizes L which is the sum of a cross-entropy term, and a regularization term to regularize the confidence score (weighted by λ). $W_j$ denotes a classifier weight for $j^{th}$ class. C is the total number of training classes. M is the minibatch size. In these equations m is a fixed angular margin. $\hat{W}$ and $\hat{x}$ are the unit-normalized form of W and x respectively. Also in these equations $x_i$(embedding vector of input I) and $s_i$ are both outputs of the embedding module, where $s_i$ is used only during training.

$$L = -\frac{1}{M} \sum_{i=1}^{M} \left( \log p_i - \lambda s_i^2 \right) \quad \text{(Equation 1)}$$

$$p_i = \frac{e^{S_i\left(\hat{W}_{y_i}^T \hat{x}_i - m\right)}}{e^{S_i\left(\hat{W}_{y_i}^T \hat{x}_i - m\right)} + \sum_{j=1, j \neq y_i}^{C} e^{\hat{W}_j^T \hat{x}_l}} \quad \text{(Equation 2)}$$

$$p_i = \frac{e^{S_i\left(\hat{W}_{y_i}^T \hat{x}_i - m\right)}}{e^{S_i\left(\hat{W}_{y_i}^T \hat{x}_i - m\right)} + \sum_{j=1, j \neq y_i}^{C} e^{\hat{W}_j^T \hat{x}_l}}$$

The second training representation data 820(2) is processed by a second classification module 916(2) to determine a second classification loss 948. The second classification module 916(2) may utilize the same loss function as the first classification module 916(1). For example, the second classification module 916(2) may utilize the HyperSpherical loss function.

The similarity loss module 918 accepts as input the transformed representation data 914 and the second training representation data 820(2) and determines a similarity loss 944.

In one implementation, the similarity loss module 918 may implement a mean squared error (MSE) and cosine distance loss function. In other implementations, other loss functions may be used. For example, an MSE loss may be used.

The divergence loss module 920 accepts as input the first classification loss 942 and the second classification loss 948 and determines a divergence loss 946. In one implementation, the divergence loss module 920 may implement a Kullback-Leibler divergence (KLD) function.

Loss value(s) 960 comprising one or more of the first classification loss 942, the second classification loss 948, the similarity loss 944, or the divergence loss 946 are then provided back to the transformer network module 910 for subsequent iterations during training.

In some implementations the transformer network module 910 may implement a cycle consistency loss function. (See "Unpaired Image-to-Image Translation Using Cycle-Consistent Adversarial Networks", Zhu, Jun-Yan. et al, arXiv: 1703.01593v7, 24 Aug. 2020.) The cycle consistency loss function may be used to minimize the distance between the first training representation data 820(1) and the transformed representation data 914. In one implementation this may result in training a first portion of the transformer network module 910 to transform the first representation data 420 into the transformed representation data 914, and a second portion of the transformer network module 910 to transform the transformed representation data 914 into third representation data. The first representation data 420 and the third representation data are expressed with a common representation space, such as the same embedding space. For example, during training the transformer network module 910 may be trained to accept an input print image as input, generate a vein image from the print image, and generate a second print image from the vein image. The input print image may then be compared with the second print image, and the transformer network module 910 trained to minimize the distance between these.

Figure 10:
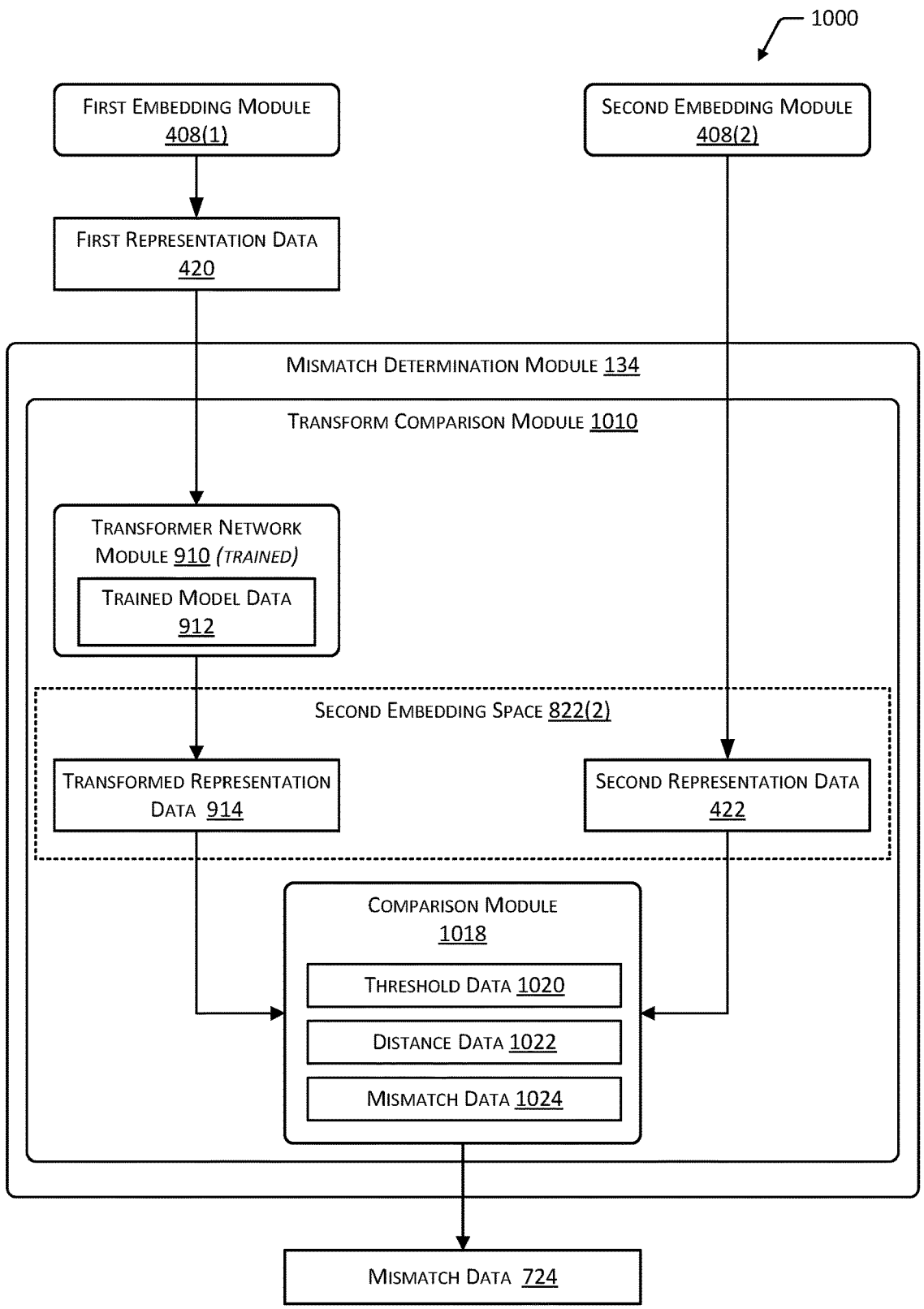
FIG. 10 is a block diagram of using a transform comparison module to determine a mismatch between input images, according to some implementations.

FIG. 10 is a block diagram 1000 of using a transform comparison module 1010 to determine a mismatch between input images, according to some implementations. The transform comparison module 1010 may be implemented by one or more computing devices 118.

The mismatch determination module 134 may comprise a transform comparison module 1010. The transform comparison module 1010 further comprises the trained transformer network module 910. As mentioned above, in some implementations the transformer network module 910 may implement a cycle consistency loss function during training.

During operation, the transform comparison module 1010 accepts as input the first representation data 420 and the second representation data 422. For example, first modality image data 114 may be processed by the first embedding module 408(1) to determine the first representation data 420 and second modality image data 116 may be processed by the second embedding module 408(2) to determine the second representation data 422.

The transformer network module 910 accepts the first representation data 420 as input and, based on the trained model data 912, determines as output transformed representation data 914. The transformed representation data 914 is in the same second embedding space 822(2) as the second representation data 422. The operation of the transformer network module 910 in this illustration may be visualized as converting a print image of a hand 102 to a vein image of that same hand 102.

A comparison module 1018 accepts as input the transformed representation data 914 and the second representation data 422 and determines as output mismatch data 1024.

In one implementation shown here the comparison module 1018 may determine distance data 1022 indicative of a distance in the second embedding space 822(2) between the transformed representation data 914 and the second representation data 422. For example, the distance data 1022 may be calculated as a cosine distance between the transformed representation data 914 and the second representation data 422. The distance data 1022 may be compared to a threshold value specified by threshold data 1020 to determine the mismatch data 1024. For example, if the distance data 1022 indicates a distance that is less than a threshold value, the input data may be deemed to be "matched" in that the input image data 112 is associated with a same hand 102. In another example, if the distance data 1022 indicates a distance that is greater than or equal to the threshold value, the input data may be deemed to be "mismatched" in that the input image data 112 is associated with different hands 102.

In another implementation the comparison module 1018 may include a classifier or other machine learning system that may be trained to accept the transformed representation data 914 and the second representation data 422 as input and provide as output mismatch data 1024 indicative of a classification of "{matched}" or "{mismatched}". In some implementations, the classifier may also be trained using one or more of the transformed representation data 914, the first representation data 420, the second representation data 422, the intersection representation data 454, the XOR representation data 464, and so forth.

In some implementations (not shown) the comparison module 1018 may, instead of or in addition to the above, perform a comparison between the first representation data 420 and second transformed representation data 914(2). The second transformed representation data 914(2) may be determined by using a second transformer network module 910(2). The transformer network module 910(2) accepts the second representation data 422 as input and, based on trained model data 912(2), determines as output second transformed representation data 914(2). The second transformed representation data 914(2) is in the same first embedding space 822(1) as the first representation data 420. In this implementation, the operation of the second transformer network module 910(2) may be visualized as converting a vein image of a hand 102 to a print image of that same hand 102.

Implementations using additional modalities may include additional representations, transformer network modules 910, and comparisons of the transformed representation data 914 produced thereby.

Similar to that described above with respect to the intersection comparison module 718, the input data may be deemed to be mismatched if any one of the comparisons made are indicative of a mismatch. For example, assume a first distance between the transformed representation data 914 and the second representation data 422 is less than the threshold distance, while a second distance between the second transformed representation data 914(2) and the first representation data 420 is greater than the threshold distance. As a result, a "match" and a "mismatch" have been determined. If the threshold data 1020 specifies a limit of 0 permissible mismatches, the data may be deemed to be mismatched.

Figure 11:
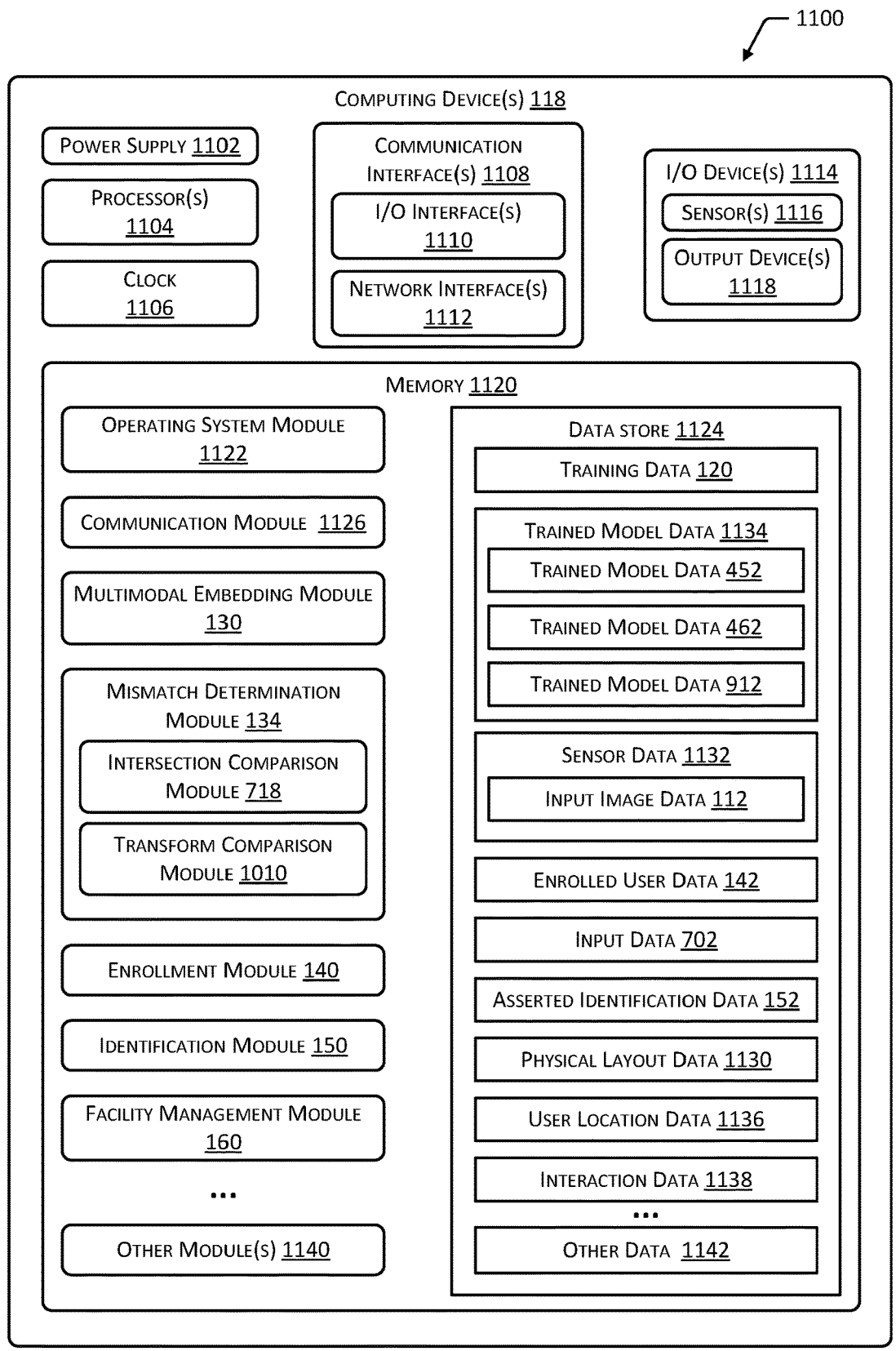
FIG. 11 is a block diagram of a computing device to implement the system, according to some implementations.

FIG. 11 is a block diagram 1100 of a computing device 118 to implement the system 100, according to some implementations. The computing device 118 may be within the scanner 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (SaaS)", "platform computing", "network-accessible platform", "cloud services", "data centers", and so forth. Services provided by the computing device 118 may be distributed across one or more physical or virtual devices.

One or more power supplies 1102 may be configured to provide electrical power suitable for operating the components in the computing device 118. The one or more power supplies 1102 may comprise batteries, capacitors, fuel cells, photovoltaic cells, wireless power receivers, conductive couplings suitable for attachment to a power source such as provided by an electric utility, and so forth. The computing device 118 may include one or more hardware processors 1104 (processors) configured to execute one or more stored instructions. The processors 1104 may comprise one or more cores. One or more clocks 1106 may provide information indicative of date, time, ticks, and so forth. For example, the processor 1104 may use data from the clock 1106 to associate a particular interaction with a particular point in time.

The computing device 118 may include one or more communication interfaces 1108 such as input/output (I/O) interfaces 1110, network interfaces 1112, and so forth. The communication interfaces 1108 enable the computing device 118, or components thereof, to communicate with other devices or components. The communication interfaces 1108 may include one or more I/O interfaces 1110. The I/O interfaces 1110 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1110 may couple to one or more I/O devices 1114. The I/O devices 1114 may include input devices such as one or more of a sensor 1116, keyboard, mouse, scanner, and so forth. The I/O devices 1114 may also include output devices 1118 such as one or more of a display device, printer, audio speakers, and so forth. In some embodiments, the I/O devices 1114 may be physically incorporated with the computing device 118 or may be externally placed. The sensors 1116 may comprise the camera 108, smartcard readers, touch sensors, microphones, and so forth.

The network interfaces 1112 may be configured to provide communications between the computing device 118 and other devices, such as routers, access points, and so forth. The network interfaces 1112 may include devices configured to couple to personal area networks (PANs), local area networks (LANs), wireless local area networks (WLANS), wide area networks (WANs), and so forth. For example, the network interfaces 1112 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 11, the computing device 118 includes one or more memories 1120. The memory 1120 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1120 provides storage of computer-readable instructions, data structures, program modules, and other data for the operation of the computing device 118. Several functional modules are shown stored in the memory 1120, although the same functionality may alternatively be implemented in hardware, firmware, or as a system on a chip (SoC).

The memory 1120 may include at least one operating system (OS) module 1122. The OS module 1122 is configured to manage hardware resource devices such as the I/O interfaces 1110, the I/O devices 1114, the communication interfaces 1108, and provide various services to applications or modules executing on the processors 1104. The OS module 1122 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 1126 may be configured to establish communications with the computing device 118, servers, other computing devices 106, or other devices. The communications may be authenticated, encrypted, and so forth.

The multimodal embedding module 130 may be stored in the memory 1120.

The enrollment module 140 may be stored in the memory 1120.

The identification module 150 may be stored in the memory 1120.

The mismatch determination module 134, such as including one or more of the intersection comparison module 718 or the transform comparison module 1010, may also be stored in the memory 1120.

Also stored in the memory 1120 may be a data store 1124 and one or more of the following modules. These modules may be executed as foreground applications, background tasks, daemons, and so forth. The data store 1124 may use a flat file, database, linked list, tree, executable code, script, or other data structure to store information. In some implementations, the data store 1124 or a portion of the data store 1124 may be distributed across one or more other devices including other computing devices 106, network attached storage devices, and so forth.

The data store 1124 may store the training data 120, transformer training data 850, and so forth. The data store 1124 may store the trained model data 1134 such as the trained model data 452, the trained model data 462, and the trained model data 912. The data store 1124 may store enrolled user data 142, input data 702, and so forth.

In some implementations, the input image data 112 may be temporarily stored during processing by the multimodal embedding module 130. For example, the scanner 104 may acquire the input image data 112, determine representation data 132 based on the input image data 112, and then erase the input image data 112. The resulting representation data 132 may then be sent to a server or other computing device 118 to perform enrollment, for comparison to assert an identity, and so forth.

The facility management module 160 may perform various functions, such as tracking items between different inventory locations, to and from carts, generating restocking orders, directing operation of robots within the facility, using the asserted identification data 152 to associate a particular user identity with a user in the facility, and so forth. During operation, the facility management module 160 may access sensor data 1132 such as input image data 112, or data from other sensors 1116.

Information used by the facility management module 160 may be stored in the data store 1124. For example, the data store 1124 may be used to store physical layout data 1130, sensor data 1132, asserted identification data 152, user location data 1136, interaction data 1138, and so forth. For example, the sensor data 1132 may comprise the input image data 112 obtained from a scanner 104 associated with the facility.

The physical layout data 1130 may provide information indicative of where scanners 104, cameras, weight sensors, antennas for radio receivers, inventory locations, and so forth are within the facility with respect to one another. For example, the physical layout data 1130 may comprise information representative of a map or floor plan of the facility with relative positions of gates with scanners 104 and inventory locations.

The facility management module 160 may generate the user location data 1136 that is indicative of the location of the user within the facility. For example, the facility management module 160 may use image data obtained by the cameras to determine a location of the user. In other implementations, other techniques may be used for determining the user location data 1136. For example, data from a smart floor may be used to determine the location of the user.

The identification data 144 may be associated with user location data 1136. For example, the user enters the facility and has their hand 102 scanned by the scanner 104, resulting in asserted identification data 152 that is associated with their time of entry and the scanner 104 location. The user location data 1136 indicative of a path of a user that begins at the scanner 104 location at the time of entry may be associated with the user identifier in the asserted identification data 152.

Based on the user location data 1136 and the interaction data 1138, a particular interaction may be associated with an account of a particular user. For example, if the user location data 1136 indicates that the user is present in front of inventory location 1192 at time 09:02:02 and the interaction data 1138 indicates a pick of a quantity of one item from an area on inventory location 1192 at 09:04:13, the user may be billed for that pick.

The facility management module 160 may use the sensor data 1132 to generate the interaction data 1138. The interaction data 1138 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 160 may generate interaction data 1138 that indicates what item the user picked from a particular lane on a shelf, and then use this interaction data 1138 to adjust the count of inventory stowed at that lane. The interaction data 1138 may then be used to bill an account associated with the user identifier that is associated with the user who picked the item.

The facility management module 160 may process the sensor data 1132 and generate output data. For example, based on the interaction data 1138, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 1140 may also be present in the memory 1120 as well as other data 1142 in the data store 1124. For example, a billing module may use the interaction data 1138 and the asserted identification data 152 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 152. In another example, a robot may incorporate a scanner 104. The robot may use the asserted identification data 152 to determine whether to deliver a parcel to the user, and based on the asserted identification data 152, which parcel to deliver.

While the input to the system 100 is discussed with respect to image data, the system may be used with other types of input. For example, the input may comprise data acquired from one or more sensors 1116, data generated by another system, and so forth. For example, instead of image data produced by the camera 108, the input to the system 100 may comprise an array of data. Other modalities may also be used. For example, the first modality may be visible light, the second modality may be sonar, and so forth.

While the system 100 is discussed with respect to processing biometric data, the system may be used with other types of data. For example, the input may comprise satellite weather imagery, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations.

Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more memories, storing first computer-executable instructions; and
   one or more hardware processors to execute the first computer-executable instructions to:
   determine training data comprising:
   a first modality image depicting first features of a first hand,
   a first identity label that is associated with the first modality image and is indicative of a first identity,
   a first modality label indicative of a first modality that is associated with the first modality image, a second modality image depicting second features of the first hand,
a second identity label that is associated with the second modality image and is indicative of the first identity, and
a second modality label indicative of a second modality that is associated with the second modality image;
determine first intermediate representation data using a first portion of a machine learning network to process the first modality image;
determine second intermediate representation data using a second portion of the machine learning network to process the second modality image;
determine intersection representation data using a third portion of the machine learning network to process the first intermediate representation data and the second intermediate representation data, wherein the intersection representation data is representative of features of the first hand that are common among the first features and the second features; and
determine trained model data based on the intersection representation data.

2. The system of claim 1, the one or more hardware processors to further execute the first computer-executable instructions to:
determine a first input image associated with the first modality;
determine a second input image associated with the second modality;
determine third intermediate representation data using the first portion of the machine learning network to process the first input image;
determine fourth intermediate representation data using the second portion of the machine learning network to process the second input image;
determine first intersection representation data using the third portion of the machine learning network and the trained model data to process the third intermediate representation data;
determine second intersection representation data using the third portion of the machine learning network and the trained model data to process the fourth intermediate representation data; and
determine, based on the first intersection representation data and the second intersection representation data, mismatch data indicative of correspondence between the first intersection representation data and the second intersection representation data.

3. The system of claim 2, the one or more hardware processors to further execute the first computer-executable instructions to:
determine a first distance in an intersection embedding space between the first intersection representation data and the second intersection representation data; and
determine the first distance is greater than a threshold distance;
wherein the mismatch data is indicative of a mismatch between the first input image and the second input image.

4. The system of claim 2, the one or more hardware processors to further execute the first computer-executable instructions to:
determine the correspondence between the first intersection representation data and the second intersection representation data is associated with a same hand depicted by the first input image and the second input image;
determine first representation data using a fourth portion of the machine learning network to process the third intermediate representation data;
determine second representation data using a fifth portion of the machine learning network to process the fourth intermediate representation data;
determine identification data associated with the first input image and the second input image; and
determine enrolled user data that associates the first representation data and the second representation data with the identification data.

5. The system of claim 2, the one or more hardware processors to further execute the first computer-executable instructions to:
determine the correspondence between the first intersection representation data and the second intersection representation data is associated with a same hand depicted by the first input image and the second input image;
determine first representation data using a fourth portion of the machine learning network to process the third intermediate representation data;
determine second representation data using a fifth portion of the machine learning network to process the fourth intermediate representation data;
determine enrolled user data comprising previously stored representation data; and
determine, based on comparison of the first representation data and the second representation data with respect to the enrolled user data, identification data associated with the first input image and the second input image.

6. The system of claim 1, the one or more hardware processors to further execute the first computer-executable instructions to:
determine a first input image associated with the first modality;
determine a second input image associated with the second modality;
determine third intermediate representation data using the first portion of the machine learning network to process the first input image;
determine fourth intermediate representation data using the second portion of the machine learning network to process the second input image;
determine first intersection representation data using the third portion of the machine learning network and the trained model data to process the third intermediate representation data;
determine second intersection representation data using the third portion of the machine learning network and the trained model data to process the fourth intermediate representation data; and
determine, based on the first intersection representation data and the second intersection representation data, first data that is indicative of one or more of:
over- or under-exposure of the first input image,
over- or under-exposure of the second input image,
obscuration of at least a portion of the first input image,
obscuration of at least a portion of the second input image,
blurring of the first input image, or
blurring of the second input image.

7. The system of claim 1, the one or more hardware processors to further execute the first computer-executable instructions to:
 determine a first plurality of input images associated with the first modality, wherein the first plurality of input images are acquired using a first input device;
 determine a second plurality of input images associated with the second modality, wherein the second plurality of input images are acquired using the first input device;
 determine a third plurality of intermediate representation data using the first portion of the machine learning network to process the first plurality of input images;
 determine a fourth plurality of intermediate representation data using the second portion of the machine learning network to process the second plurality of input images;
 determine a first plurality of intersection representation data using the third portion of the machine learning network and the trained model data to process the third plurality of intermediate representation data;
 determine a second plurality of intersection representation data using the third portion of the machine learning network and the trained model data to process the fourth plurality of intermediate representation data; and
 determine, based on the first plurality of intersection representation data and the second plurality of intersection representation data, first data that is indicative of a hardware fault of the first input device.

8. The system of claim 1, the one or more hardware processors to further execute the first computer-executable instructions to:
 determine a first input image associated with a left hand and the first modality;
 determine a second input image associated with the left hand and the second modality;
 determine a third input image associated with a right hand and the first modality;
 determine a fourth input image associated with the right hand and the second modality;
 determine third intermediate representation data using the first portion of the machine learning network to process the first input image;
 determine fourth intermediate representation data using the second portion of the machine learning network to process the second input image;
 determine fifth intermediate representation data using the first portion of the machine learning network to process the third input image;
 determine sixth intermediate representation data using the second portion of the machine learning network to process the fourth input image;
 determine first intersection representation data using the third portion of the machine learning network and the trained model data to process the third intermediate representation data;
 determine second intersection representation data using the third portion of the machine learning network and the trained model data to process the fourth intermediate representation data;
 determine third intersection representation data using the third portion of the machine learning network and the trained model data to process the fifth intermediate representation data;
 determine fourth intersection representation data using the third portion of the machine learning network and the trained model data to process the sixth intermediate representation data; and
 determine, based on the first intersection representation data, the second intersection representation data, the third intersection representation data, and the fourth intersection representation data, first data indicative of correspondence between the left hand and the right hand.

9. A computer-implemented method comprising:
 determining a first input image associated with a first modality;
 determining a second input image associated with a second modality;
 determining first intermediate representation data using a first portion of a trained machine learning network to process the first input image;
 determining second intermediate representation data using a second portion of the trained machine learning network to process the second input image;
 determining first intersection representation data using a third portion of the trained machine learning network to process the first intermediate representation data, wherein the first intersection representation data is associated with features that are common across the first modality and the second modality;
 determining second intersection representation data using the third portion of the trained machine learning network to process the second intermediate representation data, wherein the second intersection representation data is associated with features that are common across the first modality and the second modality; and
 determining, based on the first intersection representation data and the second intersection representation data, first data that is indicative of correspondence between the first intersection representation data and the second intersection representation data.

10. The method of claim 9, the determining the first data comprising:
 determining a first distance in an intersection embedding space between the first intersection representation data and the second intersection representation data; and
 determining the first data based on a comparison between the first distance and a threshold distance wherein:
  the first distance being greater than the threshold distance is indicative of a mismatch between a first hand depicted in the first input image and a second hand depicted in the second input image; and
  the first distance being less than or equal to the threshold distance is indicative of no mismatch between the first hand depicted in the first input image and the second hand depicted in the second input image.

11. The method of claim 9, further comprising:
 determining, based on the first intersection representation data and the second intersection representation data, second data that is indicative of one or more of:
  over- or under-exposure of the first input image,
  over- or under-exposure of the second input image,
  obscuration of at least a portion of the first input image,
  obscuration of at least a portion of the second input image,
  blurring of the first input image, or
  blurring of the second input image.

12. The method of claim 9, further comprising:
determining, based on the first data, second data that is indicative of a hardware fault of a device used to acquire the first input image and the second input image.

13. The method of claim 9, further comprising:
determining the first data indicates that the first intersection representation data and the second intersection representation data are associated with a same hand;
determining first representation data using a fourth portion of the trained machine learning network to process the first intermediate representation data;
determining second representation data using a fifth portion of the trained machine learning network to process the second intermediate representation data;
determining identification data associated with the first input image and the second input image; and
determining enrolled user data that associates the first representation data and the second representation data with the identification data.

14. The method of claim 9, further comprising:
determining the first data indicates that the first intersection representation data and the second intersection representation data are associated with a same hand;
determining first representation data using a fourth portion of the trained machine learning network to process the first intermediate representation data;
determining second representation data using a fifth portion of the trained machine learning network to process the second intermediate representation data;
determining enrolled user data comprising previously stored representation data; and
determining, based on comparison of the first representation data and the second representation data with respect to the enrolled user data, identification data associated with the first input image and the second input image.

15. The method of claim 9, further comprising:
determining the first input image is associated with a left hand and the first modality;
determining the second input image is associated with the left hand and the second modality;
determining a third input image associated with a right hand and the first modality;
determining a fourth input image associated with the right hand and the second modality;
determining third intermediate representation data using the first portion of the trained machine learning network to process the third input image;
determining fourth intermediate representation data using the second portion of the trained machine learning network to process the fourth input image;
determining third intersection representation data using the third portion of the trained machine learning network to process the third intermediate representation data;
determining fourth intersection representation data using the third portion of the trained machine learning network to process the fourth intermediate representation data; and
determining, based on the first intersection representation data, the second intersection representation data, the third intersection representation data, and the fourth intersection representation data, the first data that is indicative of correspondence between the left hand and the right hand.

16. The method of claim 9, further comprising:
accessing training data comprising:
a first plurality of images, and
a second plurality of images;
determining third intermediate representation data using the first portion of the trained machine learning network to process the first plurality of images;
determining fourth intermediate representation data using the second portion of the trained machine learning network to process the second plurality of images;
determining training intersection representation data using the third portion of the trained machine learning network to process the third intermediate representation data and the fourth intermediate representation data, wherein the training intersection representation data is representative of features common among those depicted in the first plurality of images and those depicted in the second plurality of images; and
training the third portion of the trained machine learning network based on the third intermediate representation data, the fourth intermediate representation data, and the training intersection representation data.

17. A computer-implemented method comprising:
determining a first input image associated with a first modality;
determining a second input image associated with a second modality;
determining first representation data in a first embedding space using a first portion of a first machine learning network to process the first input image;
determining second representation data in a second embedding space using a second portion of the first machine learning network to process the second input image;
determining first transformed representation data in the second embedding space using a second machine learning network to process the first representation data; and
determining, based on the first transformed representation data and the second representation data, first data that is indicative of correspondence between the first input image and the second input image, wherein the correspondence is indicative of one of:
the first input image and the second input image being associated with a same hand, or
the first input image and the second input image being associated with different hands.

18. The method of claim 17, further comprising:
determining second transformed representation data in the first embedding space using a third machine learning network to process the second representation data;
determining, based on the second transformed representation data and the first representation data, second data that is indicative of correspondence between the first input image and the second input image; and
determining, based on the first data and the second data, third data indicative of the correspondence between the first input image and the second input image.

19. The method of claim 17, further comprising:
determining that the first data indicates that the first representation data and the first transformed representation data are associated with the same hand;
determining identification data associated with the first input image and the second input image; and
determining enrolled user data that associates the first representation data and the second representation data with the identification data.

20. The method of claim 17, further comprising:
determining that the first data indicates that the first representation data and the first transformed representation data are associated with the same hand;
determining enrolled user data comprising previously stored representation data; and
determining, based on comparison of the first representation data and the second representation data with respect to the enrolled user data, identification data associated with the first input image and the second input image.

\* \* \* \* \*